United States Patent [19]
Ishida

[11] Patent Number: 5,903,613
[45] Date of Patent: May 11, 1999

[54] DATA RECEPTION DEVICE, DATA RECEPTION METHOD AND ELECTRONIC EQUIPMENT

[75] Inventor: Takuya Ishida, Suwa, Japan

[73] Assignee: Seiko Epson Corporation, Tokyo, Japan

[21] Appl. No.: 08/785,275

[22] Filed: Jan. 21, 1997

[30] Foreign Application Priority Data

Jan. 23, 1996 [JP] Japan ......................................... 8-9276

[51] Int. Cl.⁶ .............................. H03D 1/00; H04L 27/06; H04L 25/00; H04B 3/00
[52] U.S. Cl. ......................... 375/340; 375/257; 371/57.1; 371/57.2; 371/70; 370/242; 370/248
[58] Field of Search ..................................... 375/340, 257; 371/70, 69.1, 67.1, 57.1, 57.2, 53; 370/242, 248

[56] References Cited

U.S. PATENT DOCUMENTS

| | | | |
|---|---|---|---|
| 5,164,960 | 11/1992 | Wincn et al. ............................. | 375/224 |
| 5,257,287 | 10/1993 | Blumenthal et al. .................... | 375/292 |
| 5,418,820 | 5/1995 | Wincn ..................................... | 375/340 |
| 5,467,369 | 11/1995 | Vijeh et al. .............................. | 375/224 |

*Primary Examiner*—Stephen Chin
*Assistant Examiner*—Michael W. Maddox
*Attorney, Agent, or Firm*—Oliff & Berridge, PLC

[57] ABSTRACT

The invention relates to a data reception device for receiving packetized data in the form of a differential signal. This device comprises a data reception section that generates a digital signal an the basis of the differential signal; a decode section that generates a bit synchronization signal and serial binary data based on this digital signal; a link detection section that detects whether or not a link has been guaranteed, based on this digital signal, and outputs a link signal; and a polarity determination section that determines whether polarities have been identified correctly, based on this serial binary data, the bit synchronization signal, and the link signal. The polarity determination section determines that the polarities have been determined incorrectly when at least one of the following conditions is satisfied: the first consecutive pair of identical bits within each of n packets of data received in succession is detected to be 00, and it has been detected that the link has not been guaranteed for a specific period of time. When the polarities have been identified incorrectly, a polarity correction section of the data reception section corrects them.

30 Claims, 21 Drawing Sheets

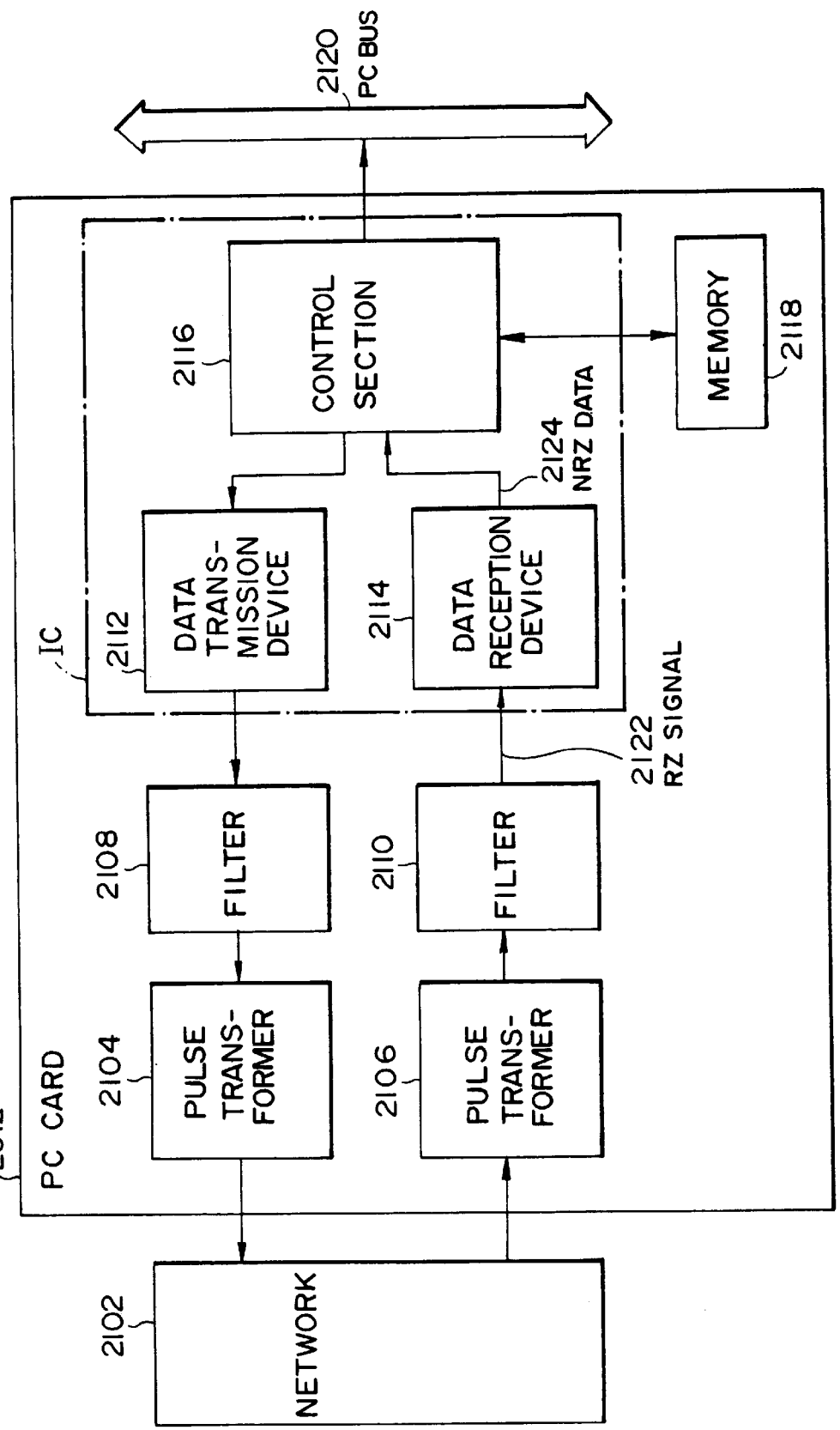

DATA RECEPTION DEVICE, DATA RECEPTION METHOD AND ELECTRONIC EQUIPMENT

BACKGROUND OF THE INVENTION

1. Field of the Invention

This invention relates to a data reception device and data reception method used to receive data that has been transmitted in accordance with certain data-transfer Standards in the form of a packetized differential signal, and electronic equipment that includes such a device.

2. Description of Related Art

A differential signal is a paired signal consisting of a positive-polarity signal and a negative-polarity signal having a waveform that is the inverse thereof. When signal lines for such positive-polarity and negative-polarity signals are connected to data reception device designed to receive this differential signal, it could happen that these signal lines are connected to a terminal that is previously designated for a positive-polarity signal and a terminal that is previously designated for a negative-polarity signal the wrong way round. If the data reception device identifies the polarities of these two signals incorrectly, it will not be possible for the receiver to read the data correctly.

It is therefore desired that this data reception device determines whether or not the polarities of the two signals received as a differential signal have been identified correctly, and also automatically correct the polarities it they have been identified incorrectly.

One prior-art technique used by data reception devices for correctly identifying the polarities of these two signals is a method that uses an idle pulse at the end of the packet to determine the polarities. An idle pulse has a long pulse width at a high level. Thus, if this prior-art technique determines that the long pulse at the end of a packet is at a low level, it determines that the terminals for the positive-polarity and negative-polarity signals have been connected reversed.

However, this method of using an idle pulse at the end of a packet for determining the polarities has disadvantages, as described below.

In order to detect this long idle pulse at the end of the packet, it is necessary to sample the idle pulse. However, there is no clock component of the packet at the rear part of this idle pulse, making it difficult to regain synchronization.

To identify this idle pulse, the circuitry of the section within the data reception device that receives the differential signal must have a certain degree of accuracy. However, the circuitry of the reception section would become complicated if it is required to have a certain degree of accuracy when receiving and decoding a signal containing jitter. It is therefore difficult to provide such a circuit that is simple and can be manufactured with a high yield.

In a data reception device that manipulates the waveform of the received signal and uses a regenerated data signal for decoding, it is possible that this method of using the regenerated data signal to identify the idle pulse will become difficult. This is because the regenerated data signal does not necessarily reproduce the information relating to the waveform of the received signal accurately.

These problems with accuracy in the signal used for the determination make it difficult to implement this method of determining polarities using the idle pulse at the end of the packet.

SUMMARY OF THE INVENTION

An objective of this invention is to provide a data reception device, data reception method, and electronic equipment using such a device, wherein a function that automatically corrects the identification of the polarities of two signals received as a differential signal, if they should be identified incorrectly, is implemented by a simple configuration.

A first aspect of this invention relates to a data reception device for receiving packetized data in the form of a differential signal which is formed by a positive-polarity signal and a negative-polarity signal, the data reception device comprising:

a data reception means for generating a digital signal based on the differential signal;

decode means for generating a bit synchronization signal and serial binary data based on the digital signal; and polarity determination means for using the bit synchronization signal to sample the serial binary data that is output by the decode means and determine on the basis of the thus sampled data whether or not the data reception means has correctly identified the polarities of the differential signal;

wherein the polarity determination means determines that the polarities of the differential signal have been identified incorrectly, when the first consecutive pair of identical bits within a received packet of data is detected to be 00; and wherein the data reception means comprises correction means for ensuring that the polarities are identified correctly, when the polarity determination means has determined that the polarities of the differential signal have been identified incorrectly.

A differential signal is a paired signal consisting of a positive-polarity signal and a negative-polarity signal having a waveform that is the inverse thereof. The data reception means of this aspect of the invention receives this differential signal consisting of positive-polarity and negative-polarity signals, and generates a digital signal from these two signals.

If the data reception means identifies the polarities of the differential signal incorrectly, a correctly received digital signal will be regenerated with its polarities reversed. This will have the result of reversing the values of 1 and 0 in the decoded serial binary data.

Each packet of data has a preamble and a start frame delimiter (hereinafter abbreviated to SFD) at the head thereof. The preamble is designed to establish synchronization in the receiver and the SFD declares the start of a frame. A certain data transfer standard defines the preamble as 10101010 repeated a certain number of times and the SFD as 10101011.

In this preamble and SFD, the first pair of identical data bits to appear in the bit string is the final two bits of the SFD. This bit string of two identical data bits that appears first in a packet is hereinafter called "initial consecutive bits". When data is received with the correct polarity, these initial consecutive bits are 11. However, when data is received with the polarities reversed, these initial consecutive bits become 00.

The polarity determination means of this invention determines that there has been an incorrect polarity identification by checking whether or not the first pair of identical data bits to appear in a packet is 00, and detecting that this data string is 00.

If it is determined that the polarities have been identified incorrectly, the data reception means is configured to correct this error so that the polarities are identified correctly.

With this aspect of the invention, the decoded serial binary data can be used to detect any polarity identification error in the identification of polarities, so that this embodiment can be applied in a simple manner to any data reception device having an ordinary decode means. Since the final two bits of the SFD are consecutive bits that occur after synchronization has been established, there are few detection errors. Furthermore, since this method uses data specified in accordance with data-transfer Standards, polarity identification errors can be detected easily, irrespective of the contents of the sent data.

Since this method is not dependent on the accuracy of the data reception means, it is possible to provide a data reception device which has a simple configuration and which can perform this detection in a simple manner.

A second aspect of this invention relates to a data reception device for receiving packetized data in the form of a differential signal which is formed by a positive-polarity signal and a negative-polarity signal, the data reception device comprising:

a data reception means for generating a digital signal based on the differential signal;

decode means for generating a bit synchronization signal and serial binary data based on the digital signal; and polarity determination means for using the bit synchronization signal to sample the serial binary data that is output by the decode means and determine on the basis of the thus sampled data whether or not the data reception means has correctly identified the polarities of the differential signal.

wherein the polarity determination means determines that the polarities of the differential signal have been identified incorrectly, when the first consecutive pair of identical bits within each of n packets of data received in succession is detected to be 00; and wherein the data reception means comprises correction means for ensuring that the polarities are identified correctly, when the polarity determination means has determined that the polarities of the differential signal have been identified incorrectly.

This aspect of the invention determines that a polarity identification error has occurred if this data string is detected to be 00 in each of n packets of data received in succession. This makes it possible to eliminate more of the effects of jittering and pulse offset in the signal than is possible with the method that determines incorrect polarity identification from a single packet, as well as noise generated during transmission and signal loss. It is therefore possible to correct errors in polarity identification accurately, with no misoperation.

A third aspect of this invention relates to a data reception device for receiving packetized data in the form of a differential signal which is formed by a positive-polarity signal and a negative-polarity signal, the data reception device comprising:

a data reception means for generating a digital signal based on the differential signal;

decode means for generating a bit synchronization signal and serial binary data based on the digital signal;

link detection means for detecting whether or not a link which is characteristic of a physical layer and defined in certain data-transfer Standards has been guaranteed, on the basis of the digital signal generated by the data reception means; and polarity determination means for using the bit synchronization signal to sample the seriel binary data that is output by the decode means and thereby determine whether or not the data reception means has identified the polarities of the differential signal correctly, on the basis of the sampled data and the detection result of the link detection means;

wherein the polarity determination means determines that the polarities of the differential signal have been identified incorrectly when at least one of the following conditions is satisfied: the first consecutive pair of identical bits in each of n packets of data received in succession is detected to be 00, and it is detected that the link has not been guaranteed over a specific period of time, on the basis of the detection result of the link detection means; and wherein the data reception means comprises correction means for ensuring that the polarities are identified correctly, when the polarity determination means has determined that the polarities of the differential signal have been identified incorrectly.

The data-transfer Standards specify that a device that transmits data should issue link-test pulses at fixed intervals when it is not transmitting data, to determined whether or not a link which is characteristic of the physical layer is guaranteed. The receiver judges whether or not the link is guaranteed on the basis of these link-test pulses.

Therefore, the data reception device of this invention has a state in which it receives these link-test pulses, when it is still physically connected to another data transmission device but no data is arriving. The link detection means of this invention is configured in such a manner that it uses the digital signal that is the output of the data reception means to detect whether or not this link is guaranteed. Thus, if the polarities of the differential signal have been identified incorrectly in the data reception means, it will not be possible to detect the reception of these link-test pulses. The data reception device of this invention can therefore determine that the data reception means has identified the polarities incorrectly if the link has not been guaranteed for a specific period of time when no data is arriving.

In this case, the polarity determination means of this invention determines that the polarity identification is incorrect if at least one of the conditions described below is satisfied. The first condition occurs when the decoded serial binary data is used to check whether or not the first pair of identical data bits to appear in a packet is 00, and this data string is detected to be 00 in each of n packets of data received in succession. The second condition occurs when a link which is characteristic of a physical layer and defined in certain data-transfer Standards has not been guaranteed for a specific period of time.

This arrangement makes it possible to use the first determination method when data is being received and the second determination method when link-test pulses are being received.

This aspect of the invention makes it possible to detect polarity identification errors in a simple manner, by using these characteristics of the link-test pulses.

Furthermore, polarity identification errors can be detected even when only link-test pulses are being received, not data. Thus any error in polarity identification can be detected and also corrected while link-test pulses are received, before data is to be received. This has the effect of ensuring that polarity can be identified correctly from the initial packet.

The link detection means of this invention may comprise means for detecting a link test fail state by testing link integrity, as defined by certain data-transfer Standards; and wherein the polarity determination means determines that the polarities of the differential signal have been identified incorrectly, when at least one of the following conditions is satisfied: the first consecutive pair of identical bits within each of n packets of data received in succession is detected to be 00, and the link test fail state has been detected to continue for a specific period of time.

An ordinary data reception device is designed to have a link integrity test function for arbitrating the method used for communicating with the transmitter, on basis of certain data-transfer Standards. This link integrity test function checks a dedicated link within a physical layer, as defined by these standards. If the link is normally guaranteed by the link integrity test function defined by these standards, a corresponding point in a Link Integrity Test Function State Diagram lies within a Link Test Pass state (hereinafter called a link state); all other cases lie within a link test fail state. These standards define a number of states other than the link state, but in this document all of these many states are handled as a single link test fail state.

The link detection means within the data reception device of this invention is configured to have means for testing this link integrity, on the basis of the digital signal that is output from the data reception means. This provision of a link integrity test means within the link detection means ensures that this invention can provide a data reception device which has a simple configuration and is capable of determining polarity when no data is arriving.

The polarity determination means of this invention may omit subsequent polarity determinations when the first consecutive pair of identical bits within each of n packets of data received in succession is detected to be 00.

The polarity determination means of this invention may omit this and subsequent polarity determinations when the first consecutive pair of identical bits within each of n packets of data received in succession is detected to be 11.

A polarity identification error is caused by an inverted connection when the two signal lines of a differential signal are connected to the terminals of a data reception device. Thus, once a polarity identification error that is caused by a mis-connection is corrected, there is no need for further correction until the connection is re-established physically.

With this invention, where polarity identification errors are detected on the basis of a plurality of packets in succession, there is virtually no likelihood of an error in determination. This means that, once a polarity identification error caused by a mis-connection is corrected, or once it is confirmed that the polarity identification is correct, it is not necessary to provide further correction. Thus, omitting subsequent determinations, or the current and subsequent determinations, enables efficient processing.

Note that if the two signal lines for the differential signal are physically reconnected to the terminals of the data reception device, that reconnection is likely to cause a new polarity identification error, so the data reception device is configured in such a manner that this polarity identification is restarted.

The decode means of this invention may generate the bit synchronization signal and the serial binary data according to edges of the digital signal.

The decode means can utilize edges of the digital signal to generate the bit synchronization signal and serial binary data. This has the effect of making it unnecessary to require that the comparator, used in the data reception means that converts the received signal into a digital signal, has a high level of accuracy.

The data reception means of this invention may generate a comparison input potential on the basis of the differential signal, then generate the digital signal on the basis of the comparison input potential and the potential of one of the positive-polarity and negative-polarity signals which form the differential signal.

The data reception means can generate the digital signal from the comparison potential and the potential of one of the positive-polarity and negative-polarity signals forming the differential signal, so that the data reception means of a simple circuit configuration can be provided. Thus with a single comparator in the data reception means, a digital signal which has a higher resistance to small-amplitude noise can be generated.

Therefore, a data reception device that can perform polarity determinations even when no data is arriving can be provided, without needing to complicate the circuit configuration of the data reception means.

A fourth aspect of this invention relates to a data reception device for receiving Packetized data in the form of a differential signal which is formed by a positive-polarity signal and a negative-polarity signal, the data reception device comprising:

a data reception means for generating a digital signal based on the differential signal;

decode means for generating a bit synchronization signal and serial binary data according to edges of the digital signal;

link detection means for detecting whether or not a link which is characteristic of a physical layer and defined in certain data-transfer Standards has been guaranteed, on the basis of the digital signal generated by the data reception means; and polarity determination means for determining whether or not the data reception means has correctly identified the polarities of the differential signal, on the basis of the detection result of the link detection means;

wherein the polarity determination means determines that the polarities of the differential signal have been identified incorrectly, when it is detected that the link has not been guaranteed over a specific period of time on the basis of the detection result of the link detection means; and wherein the data reception means comprises correction means for ensuring that the polarities are identified correctly, when the polarity determination means has determined that the polarities of the differential signal have been identified incorrectly.

Since the decode means of this invention generates the bit synchronization signal and serial binary data from edges of the digital signal generated by the data reception means, it is not necessary to require that the comparator used in the data reception means has a high level of accuracy.

A standard component in an ordinary data reception device is means for detecting whether a link which is characteristic of a physical layer is guaranteed, as laid down in certain data-transfer Standards, so this can be used as the link detection means of the data reception device of this invention. In this case, the link detection means of this invention detects whether the dedicated link in the physical layer is guaranteed, on the basis of the digital signal that is output from the data reception means. Since a high level of accuracy is not required for determining the presence of link-test pulses, the output of the data reception means is sufficient for this purpose, even though it does not use a comparator that would require a high level of accuracy.

Any polarity identification error generated by the data reception means can be detected from this detection result.

In other words, if link-test pulses are not received correctly, the data reception means can determine therefrom that a polarity identification error has occurred.

In this manner, the present invention makes it possible to provide a data reception device which has a simple configuration and uses link detection means to determine polarity even when no data is arriving.

The polarity determination means of this invention may output a polarity indication signal having one of a first state and a second state, on the basis of a determination as to whether or not the polarities of the differential signal have been identified correctly; and wherein the data reception means may have a first terminal and a second terminal for receiving the differential signal, regards a signal input into the first terminal to have positive polarity and a signal input into the second terminal to have negative polarity when the polarity indication signal is in the first state, or regard a signal input into the first terminal to have negative polarity and a signal input into the second terminal to have positive polarity when the polarity indication signal is in the second state, in order to generate a digital signal.

The polarity determination means outputs a polarity indication signal that depends on the determination result, and the data reception means uses this polarity indication signal as the basis for correcting any error in the polarity identification of the signals input into the first and second terminals, so that polarity identification errors can be corrected with a simple configuration.

An fifth aspect of this invention relates to Electronic equipment that receives and processes packetized data in the form of a differential signal which is formed by a positive-polarity signal and a negative-polarity signal, the electronic equipment comprising:

a data reception device as defined in claim 15, for generating a bit synchronization signal and serial binary data based on the differential signal; and processing means for performing processing on the basis of the bit synchronization signal and the serial binary data.

This aspect of the invention makes it possible to provide electronic equipment which has a simple configuration but can automatically adjust itself so that the polarities of a differential signal are identified correctly, even when the two signal lines configuring the differential signal are connected the wrong way round to the two terminals of the electronic equipment receiving that signal.

BRIEF DESCRIPTION OF THE DRAWINGS

FIG. 21 is a function block diagram of a PC card.

DESCRIPTION OF PREFERRED EMBODIMENTS

First Embodiment

The description first concerns the signal received by the data reception device of this embodiment and the relationship between this signal and polarity.

Figure 2:
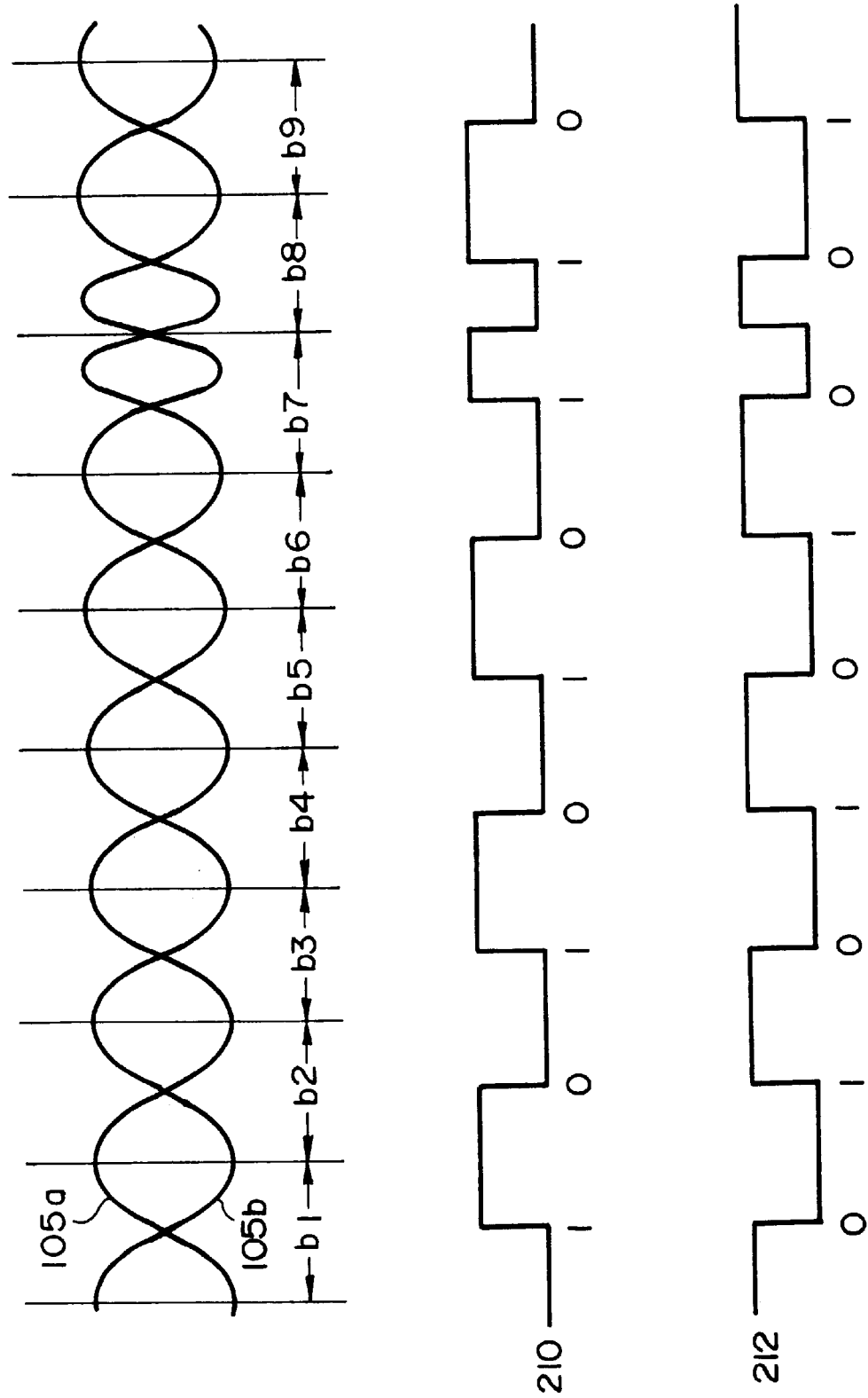
FIG. 2 shows the differential signal in the vicinity of the head of a packet received by the data reception device of the first embodiment, together with a digital signal used for decoding, which is generated based on this differential signal.

Signals 105a and 105b which forms a differential signal in the vicinity of the head of a packet to be received by the data reception device of this embodiment are shown in FIG. 2, together with digital signals 210 and 212 used for decoding, which are generated from the differential signal.

A differential signal is a paired signal consisting of a positive-polarity signal and a negative-polarity signal that has a waveform that is the inverse thereof, where the data is represented by transitions in the potential of the positive-polarity signal. In FIG. 2, assume that 105a is the positive-polarity signal and 105b is the negative-polarity signal.

Since the data transmitted by this differential signal is Manchester-coded, the potential of the positive-polarity signal at the center of the bit interval goes from high to low in order to send a binary "0", or from low to high to send a binary "1".

Symbols b1, b2, etc., in FIG. 2 denote bit intervals. Data sent in the form of a differential signal can be identified by transitions in potential at the centers of the bit intervals b1, b2, etc., of the positive-polarity signal 105a, so that the data sent bit the differential signal shown in FIG. 2 is: 101010110 . . . . Reference number 210 denotes a digital signal generated on the basis of transitions in potential at the centers of the bit intervals of the signal 105a.

Figure 3A:
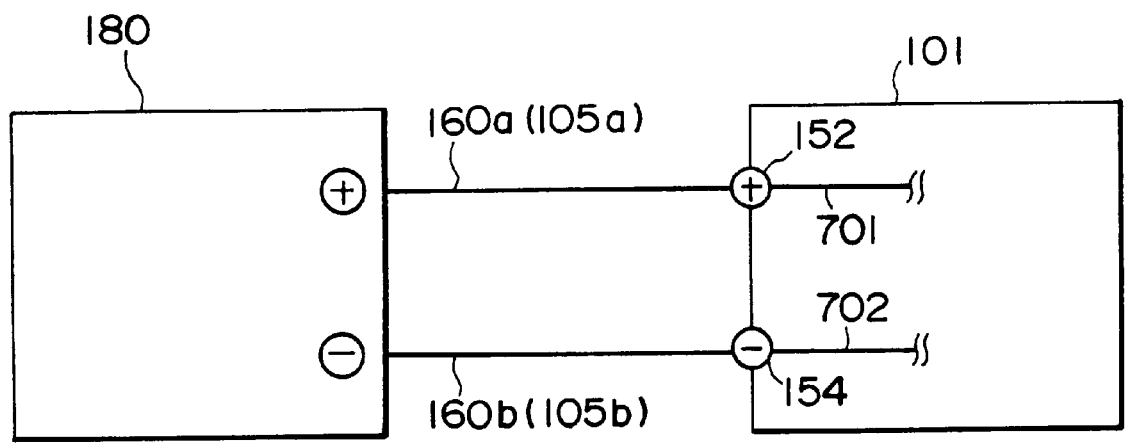
FIGS. 3A and 3B shows connective relationships of the differential signal lines between a data transmission device and data reception device.
Figure 3B:
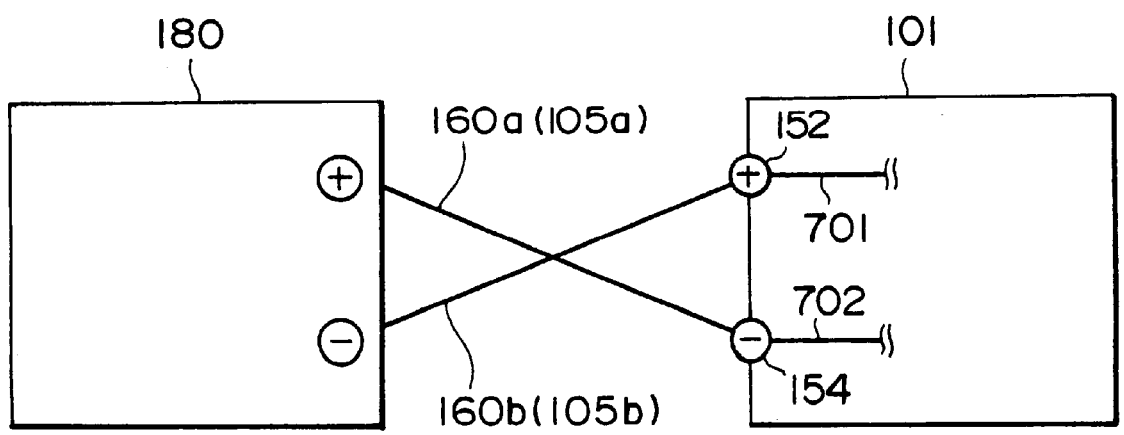

Diagrams illustrating the connective relationships of differential signal lines (for example, twisted-pair lines) 160a and 160b between a data transmission device 180 and a data reception device 101 are shown in FIGS. 3A and 3B.

As shown in FIG. 3A, differential signal lines 106a and 160b are used for transmitting a differential signal from the data transmission device 180 to the data reception device 101. The data reception device 101 has two terminals to which the differential signal lines 106a and 160b are connected. Assume that a signal which is input to a first terminal 152 thereof is a first receive signal 701 and a signal which is input to a second terminal 154 thereof is a second receive signal 702.

FIG. 3A shows a state in which the differential signal line 160a carrying the positive-polarity signal 105a and the differential signal line 160b carrying the negative-polarity signal 105b is connected correctly to the two terminals 152 and 154. In this case, the data reception device 101 handles the first receive signal 701 as a positive-polarity signal. Ordinarily, if the connection between the two terminals 152 and 154 and the differential signal lines 106a and 160b is laid down by specifications, the signal polarities of the first receive signal 701 and the second receive signal 702 can be handled in a fixed manner.

However, it could happen that the differential signal lines 106a and 160b are connected the wrong way round to the two terminals 152 and 154 of the data reception device.

FIG. 3B shows a connection that is the opposite way round from the normal connection. When connected as shown in FIG. 3B, the differential signal line 160a carrying the positive-polarity differential signal 105a is connected to the terminal 154, the opposite way round from that shown in FIG. 3A. Thus the receive signal that is handled as a positive-polarity signal is not the first receive signal 701 but the second receive signal 702.

Therefore, if the data reception device 101 in this case has a configuration such that the polarities of signals are determined in a fixed manner by the terminals 152 and 154 that received the signals, the polarities of the first receive signal 701 and the second receive signal 702 will be identified as being the wrong way round. That is, data will be identified at the transitions in potential at the centers of the bit intervals b1, b2, etc., of the negative-polarity signal 105b Thus the data sent by the differential signal of FIG. 2 will become 010101001 . . . , generating the digital signal shown at 212.

If the polarities of the signals are identified incorrectly in this manner, "0" sent in the data will be inverted to "1" and "1" to "0". The description now turns to the configuration of a data reception device in accordance with the first embodiment of this invention, which automatically detects and corrects such a polarity identification error.

Figure 1:
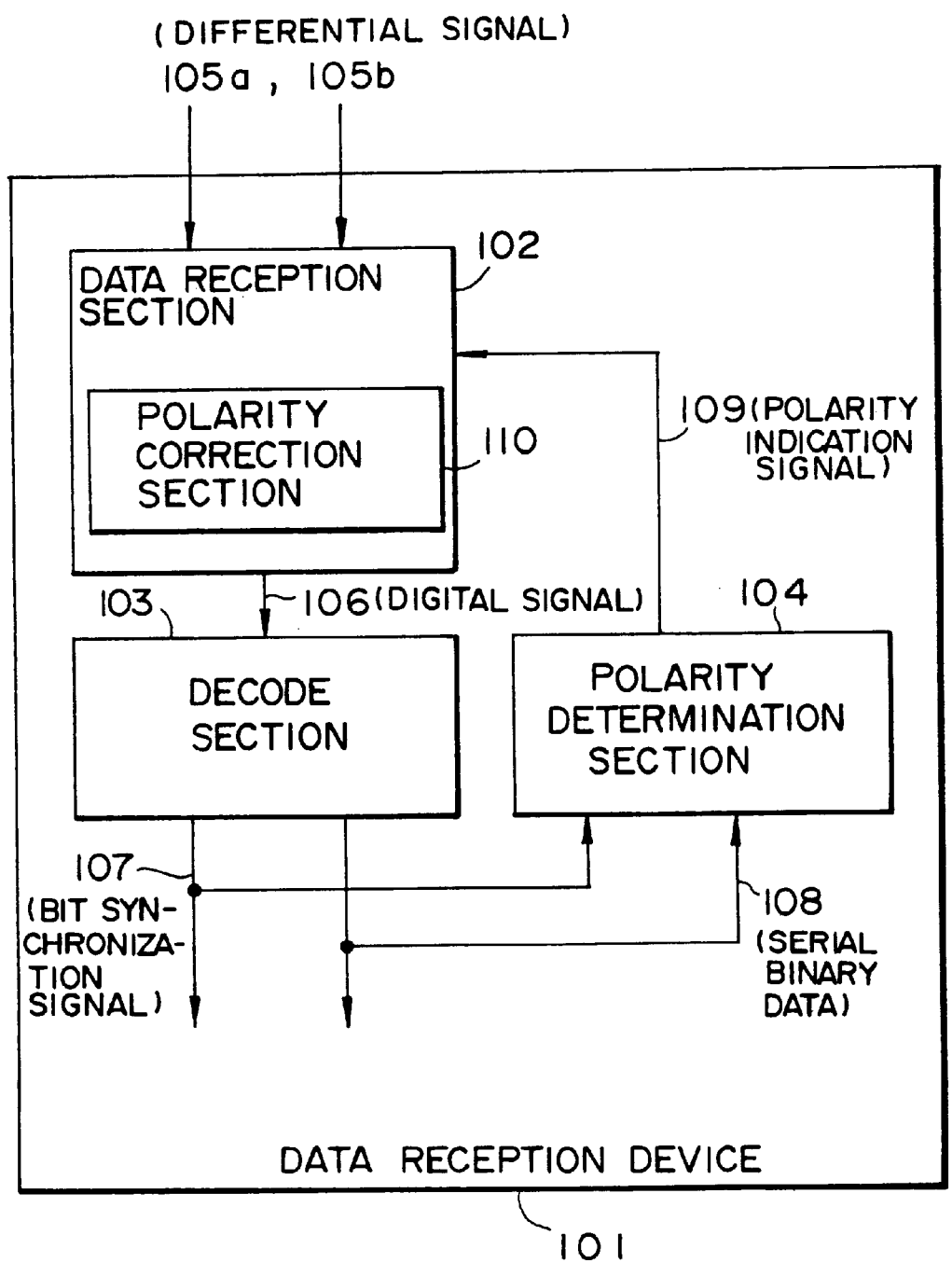
FIG. 1 is a function block diagram of a data reception device in accordance with a first embodiment of this invention.

A function block diagram of the data reception device 101 of this first embodiment is shown in FIG. 1.

This data reception device 101 comprises a data reception section 102, a decode section 103, and a polarity determination section 104. The data reception section 102 receives two signals 105a and 105b which form a differential signal and outputs a digital signal 106 on the basis of these signals 105a and 105b. This data reception section 102 also comprises a polarity correction section 110 that corrects any error in identification of the polarities of the signals 105a and 105b, on the basis of a polarity indication signal 109 which will be described later. The decode section 103 receives the digital signal 106 and generates a bit synchronization signal 107 and non-return-to-zero (NRZ) serial binary data 108, based on this digital signal 106. The polarity determination section 104 uses the bit synchronization signal to sample this NRZ serial binary data, uses the thus sampled data to determine whether or not the data reception section 102 has correctly identified the polarities of the signals 105a and 105b, and outputs the polarity indication signal 109 which has two states.

This embodiment is characterized in that it detects initial consecutive bits of the packet, using the serial binary data after it has been decoded.

In other words, the data reception device of this embodiment receives packetized data that has a preamble and a start frame delimiter (SFD) at the head thereof. According to the ISO/IEC Standard 8802-3 or IEEE Standard 802.3 (hereinafter abbreviated to Standards), the preamble is 10101010 repeated a certain number of times and the SFD is 10101011. Thus the initial consecutive bits to appear from the preamble and the SFD are the final two bits of the SFD. When these initial consecutive bits are 11, it is possible to determine that the data reception section 102 has identified the polarities of the first and second receive signals correctly. When they are 00, it is possible to determine that the data reception section 102 has identified the polarities of the first and second receive signals the wrong way round. This polarity determination section 104 causes the state of the polarity indication signal 109 to change on the basis of these initial consecutive bits, as described below.

Figure 4:
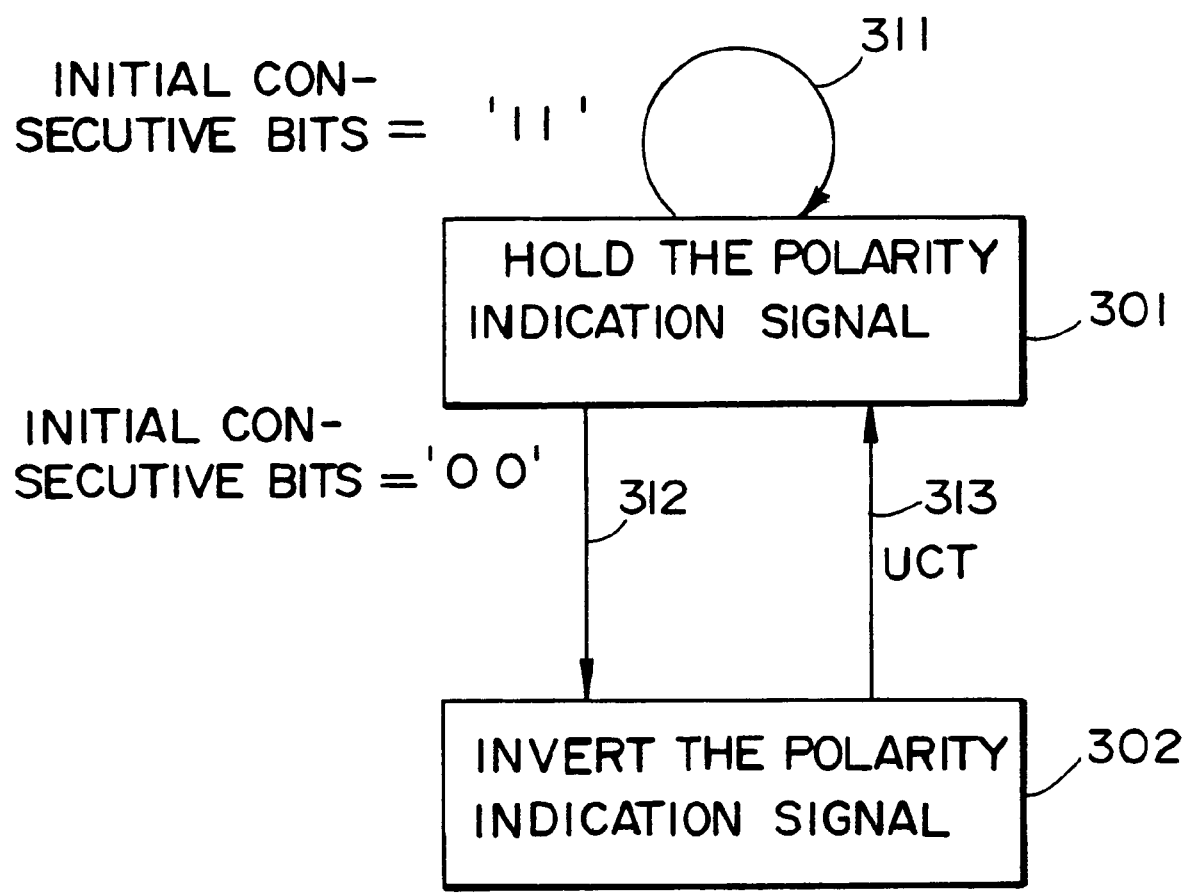
FIG. 4 shows an example of the state transitions in the polarity determination section.

An example of state transitions in the polarity determination section 104 is shown in FIG. 4.

The polarity indication signal 109 of FIG. 1 is configured to have either of two states: a first state and a second state. In a state 301 of FIG. 4, the polarity indication signal 109 is maintained in the first state if it is in that first state or it is maintained in the second state if it is in that second state, then the system waits until initial consecutive bits appear. In a state 302, the polarity indication signal 109 is inverted to the second state if it is in the first state or it is inverted to the first state if it is in the second state. UCT is an unconditional transition. The initial state is state 301.

In state 301, the state remains at state 301 (311) if initial consecutive bits that are data 11 appear. In state 301, the state changes to state 302 (312) if initial consecutive bits that are data 00 appear. From state 302, the state changes unconditionally to state 301 (313). These state transitions ensure that the polarity indication signal 109 is inverted it the initial consecutive bits are 00.

Figure 5:
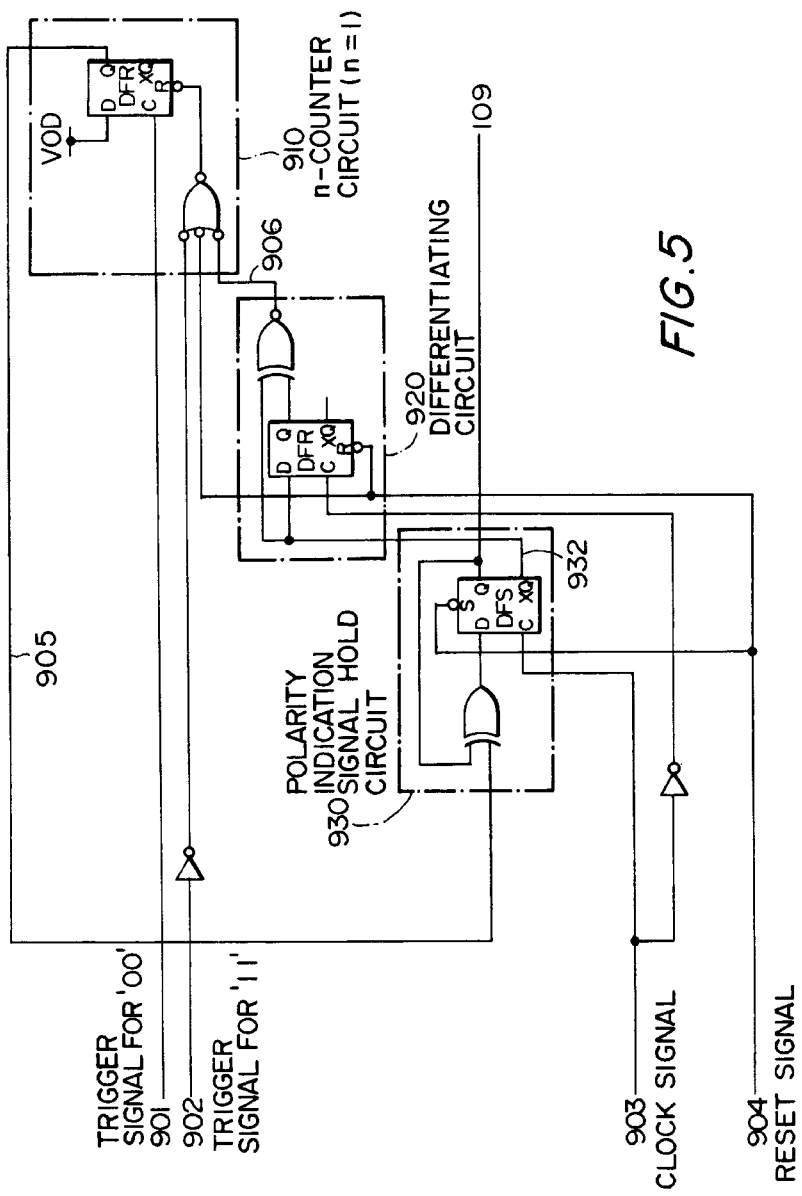
FIG. 5 shows an example of the circuit configuration for outputting the polarity indication signal from the polarity determination section on the basis of the initial consecutive bits.

An example of a circuit configuration for outputting the polarity indication signal 109 from the polarity determination section 104 on the basis of the initial consecutive bits is shown in FIG. 5. This circuit comprises an n-counter circuit (where n=1) 910, a differentiating circuit 920, and a polarity indication signal hold circuit 930. Reference number 901 denotes a trigger signal that causes a pulse to be output when the initial consecutive bits are 00, 902 denotes a trigger signal that causes a pulse to be output when the initial consecutive bits are 11, 903 denotes a 10-MHz clock signal, 904 denotes a reset signal, and 109 denotes the Polarity indication signal.

Note that there is no particular necessity for the clock signal 903 to be at 10 MHz; it can be of any frequency provided that its period is short enough in comparison with the timing at which the initial consecutive bits appear. Therefore this clock signal 903 could be the system clock of the system comprising this data reception device. The data rate could also be at the same frequency.

Similarly, the clock signal 903 need not necessarily be input continuously, as it would if it were the system clock; it could equally well be a pulse signal that is generated only when an event that causes a state change in the state machine (such as the circuit of FIG. 5) occurs.

The period of the clock signal 903 must be sufficiently shorter than the timing at which the trigger signals 901 and 902 are generated. In this particular case, one or other of these trigger signals 901 and 902 is generated once for each packet that is received. Therefore, if the frequency of the clock signal 903 is the same as the frequency of the data rate, the period of this clock signal 903 will be sufficiently shorter than the timing of the trigger signals 901 and 902. It should be noted that the trigger signals 901 and 902 need not be synchronized with the clock signal 903.

The initial state of this circuit is such that the count of the n-counter circuit (n=1) 910 has been reset to zero by the reset signal 904 and the polarity indication signal hold circuit 930 is held in its initial state.

If the initial consecutive bits are 11, the count of the n-counter circuit (n=1) 910 is reset to zero by the pulse of the trigger signal 902 and thus the level of a signal 905 that is output from the n-counter circuit (n=1) 910 goes low. When the polarity indication signal hold circuit 930 receives this low-level signal 905, it holds the polarity indication signal 109 unchanged and outputs that held polarity indication signal 109. In other words, if the initial consecutive bits are 11, the polarity indication signal 109 remains unchanged, as shown by 301 and 311 in FIG. 4.

If the initial consecutive bits are 00, the count of the n-counter circuit (n=1) 910 is incremented by the pulse of the trigger signal 901 and the level of the signal 905 output from the n-counter circuit (n=1) 910 goes high. When the polarity indication signal hold circuit 930 receives this high-level signal 905, it inverts the polarity indication signal 109 that is currently being held. A low-level pulse is then generated in a signal 906 that is output from the differentiating circuit, by a signal 932 of the opposite polarity to that of the polarity indication signal 109, which resets the count of the n-counter circuit (n=1) 910 to zero. This causes the polarity indication signal hold circuit 930 to hold this inverted polarity indication signal 109 until the initial consecutive bits are next detected to be 00. In other words, if the initial consecutive bits are detected to be 00, the polarity indication signal 109 is held inverted, as shown by 312, 302, and 313 in FIG. 4.

The description now turns to details of how the polarity correction section 110 of the data reception section 102 corrects any error in the identification of the polarities of the first receive signal 701 and the second receive signal 702.

Figure 6:
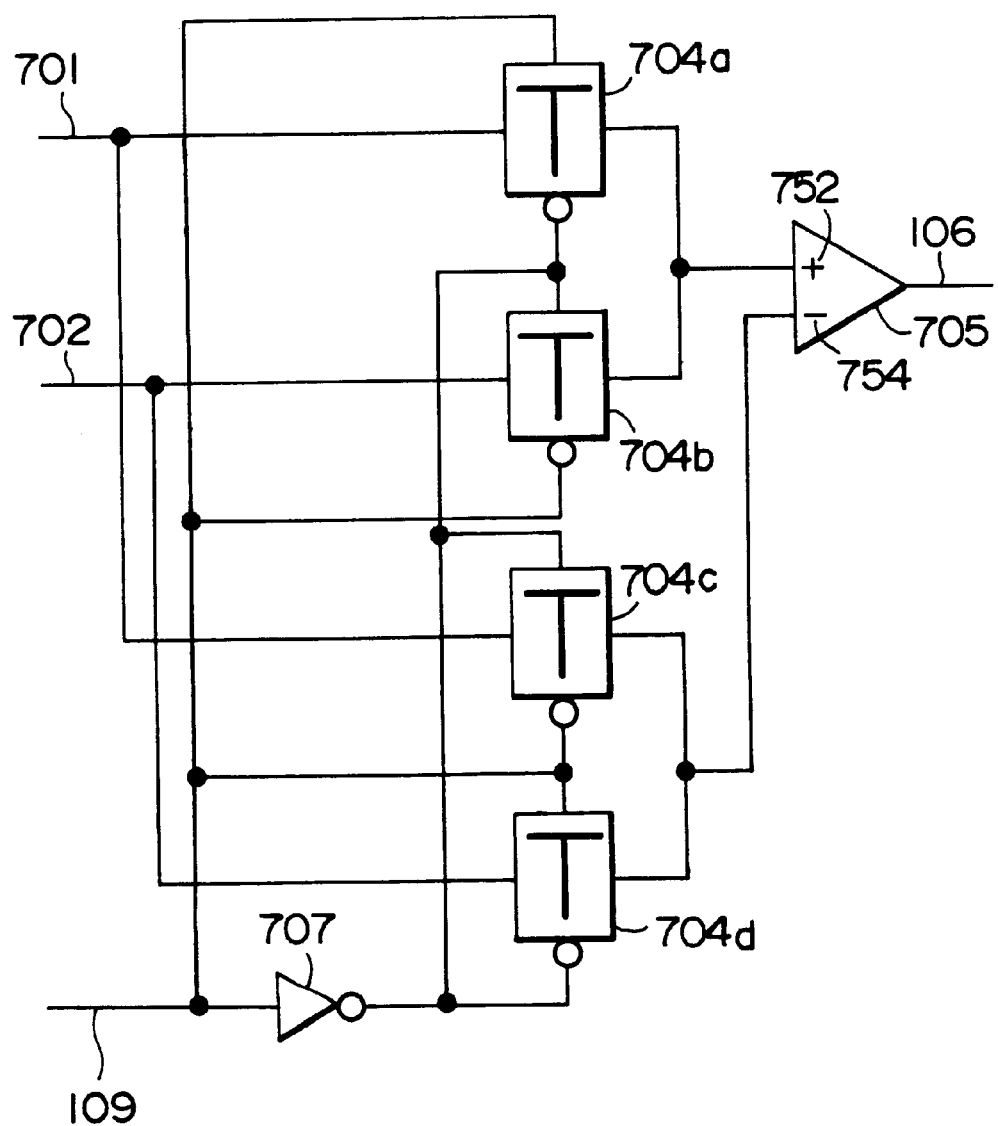
FIG. 6 shows a specific example of circuitry for correcting polarity identification within the data reception section.

A specific example of circuitry within the data reception section 102 that corrects an error in the identification of polarities is shown in FIG. 6. This circuit comprises transmission gates 704a to 704d, a comparator 705, and an inverter 707.

The data reception section 102 has two terminals for receiving the two signals which form the differential signal. Reference number 701 of FIG. 6 denotes the first receive signal which is a signal input to the first terminal of the two terminals, and 701 denotes the second receive signal which is a signal input to the second terminal. Reference number 109 denotes the polarity indication signal 109 that the polarity determination section 104 outputs.

With this circuit, the digital signal 106 that is to be input to the decode section is generated on the basis of transitions in polarity at the centers of bit intervals of a signal which is input to a positive-polarity input terminal 752 of the comparator 705. Therefore, in a state in which the data reception section 102 has incorrectly identified the polarities of the differential signal, the negative-polarity signal is being input to the positive-polarity input terminal 752 of the comparator 705. This circuit operates as described below to correct the polarities so that the positive-polarity signal is input to the positive-polarity input terminal 752 of the comparator, on the basis of the high/low level of the polarity indication signal 109.

That is, if the state of the polarity indication signal 109 is high, the transmission gate 704a turns on, 704b and 704c turn off, and 704d turns on. In this case, the first receive signal 701 is input to the positive-polarity input terminal 752 of the comparator 705 and the second receive signal 702 is input to a negative-polarity input terminal 754 thereof, to generate the digital signal 106.

Conversely, if the state of the polarity indication signal 109 is low, the transmission gate 704a turns off, 704b and 704c turn on, and 704d turns off. In this case, the first receive signal 701 is input to the negative-polarity input terminal 754 of the comparator 705 and the second receive signal 702 is input to the positive-polarity input terminal 752 thereof, to generate the digital signal 106.

As described with reference to FIG. 4, if it is determined that the data reception section 102 has incorrectly identified the polarities, that is if the negative-polarity signal is being input to the positive-polarity input terminal 752 of the comparator 705, the polarity determination section 104 inverts the level of the polarity indication signal 109. When this polarity indication signal 109 is inverted, the signal to be input to the positive-polarity input terminal 752 of the comparator 705 is reversed by inverting the on/off states of the transmission gates 704a to 704d. Thus the positive-polarity signal is input to the positive-polarity input terminal 752 of the comparator 705. This configuration enables the data reception device of this first embodiment to determine whether the polarities of the differential signal have been identified incorrectly, and correct them.

In this embodiment, the decoded serial binary data can be used to detect any error in the identification of polarities, so that this embodiment can be applied in a simple manner to any data reception device having an ordinary decode means. Since the final two bits of the SFD occur after synchronization has been established, there are few detection errors. Furthermore, since this embodiment uses data specified in accordance with data-transfer Standards, polarity identification errors can be detected easily, irrespective of the contents of the sent data.

Since this embodiment does not depend on an accuracy of the data reception section 102, it is possible to provide a data reception device that is capable of performing this detection in a simple manner and with a simple configuration.

Second Embodiment

The description now turns to a data reception device that is a second embodiment of this invention, which determines and corrects polarity identification errors when the initial consecutive bits are 00 in n packets of data received in succession.

The basic configuration of the data reception device of this second embodiment of the invention is the same as that of the first embodiment, shown in FIG. 1. Therefore, details of the function block diagram and the circuit for correcting any polarity identification error are the same as those of the data reception section 102 of the first embodiment, shown in FIGS. 1 and 6, and so further description thereof is omitted. The data reception device of this embodiment differs from that of the first embodiment in the structure of the polarity determination section 104. The polarity determination section 104 of this embodiment is configured to determine whether the polarity identification is incorrect when n packets of data have been received in succession and initial consecutive bits of 00 have been detected.

Figure 7:
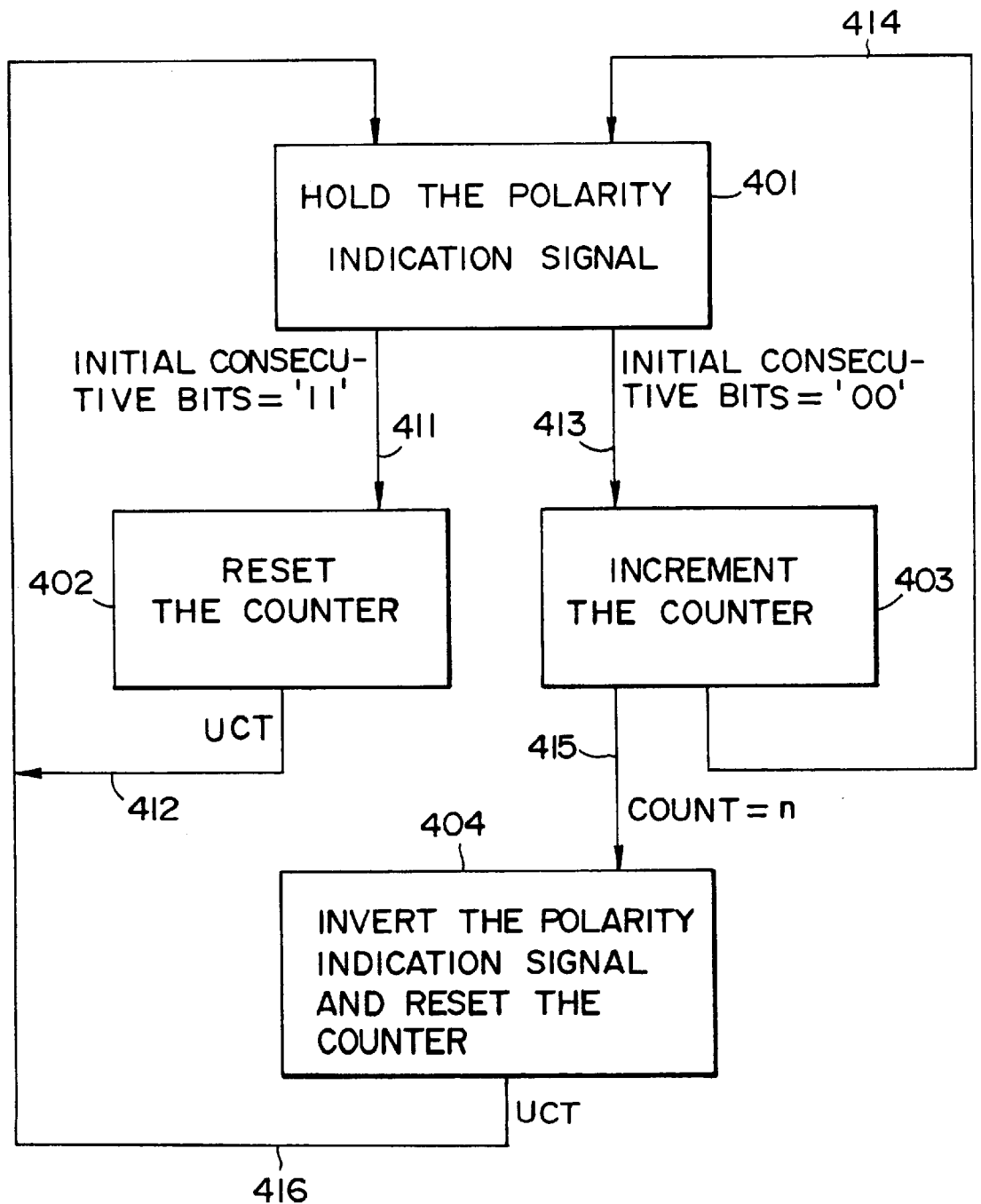
FIG. 7 shows an example of the state transitions in the polarity determination section of a data reception device in accordance with a second embodiment.

An example of state transitions in the polarity determination section 104 in the data reception device of this second embodiment is shown in FIG. 7.

The polarity indication signal 109 is configured to have either of two states: a first state and a second state. In a state 401 of FIG. 7, the polarity indication signal 109 is maintained in the first state if it is in that first state or it is maintained in the second state if it is in that second state, then the system waits until initial consecutive bits of 00 appear. A state 402 resets a counter for counting the number of times in sequence that the initial consecutive bits have been 00. A state 403 increments that counter. In a state 404, the polarity indication signal 109 is inverted to the second state if it is in the first state or it is inverted to the first state if it is in the second state, then the counter is reset. UCT is an unconditional transition. The initial state is state 401. The initial value in the counter is assumed to be 0.

In state 401 the state changes to state 402 (411) if initial consecutive bits that are data 11 appear. In state 402, the counter is reset and the state changes unconditionally to state 401 (412). In state 401, the state changes to state 403 (413) and the counter is incremented if initial consecutive bits that are data 00 appear. If the resultant value in the counter is not n, the state changes to state 401 (414); if it is n, the state changes to state 404 (415) In state 404, the polarity indication signal 109 is inverted, the counter is reset, and the state changes unconditionally to state 401 (416). These state transitions ensure that the polarity indication signal 109 is inverted when n packets are received in sequence, so long as the initial consecutive bits are 00.

Figure 8:
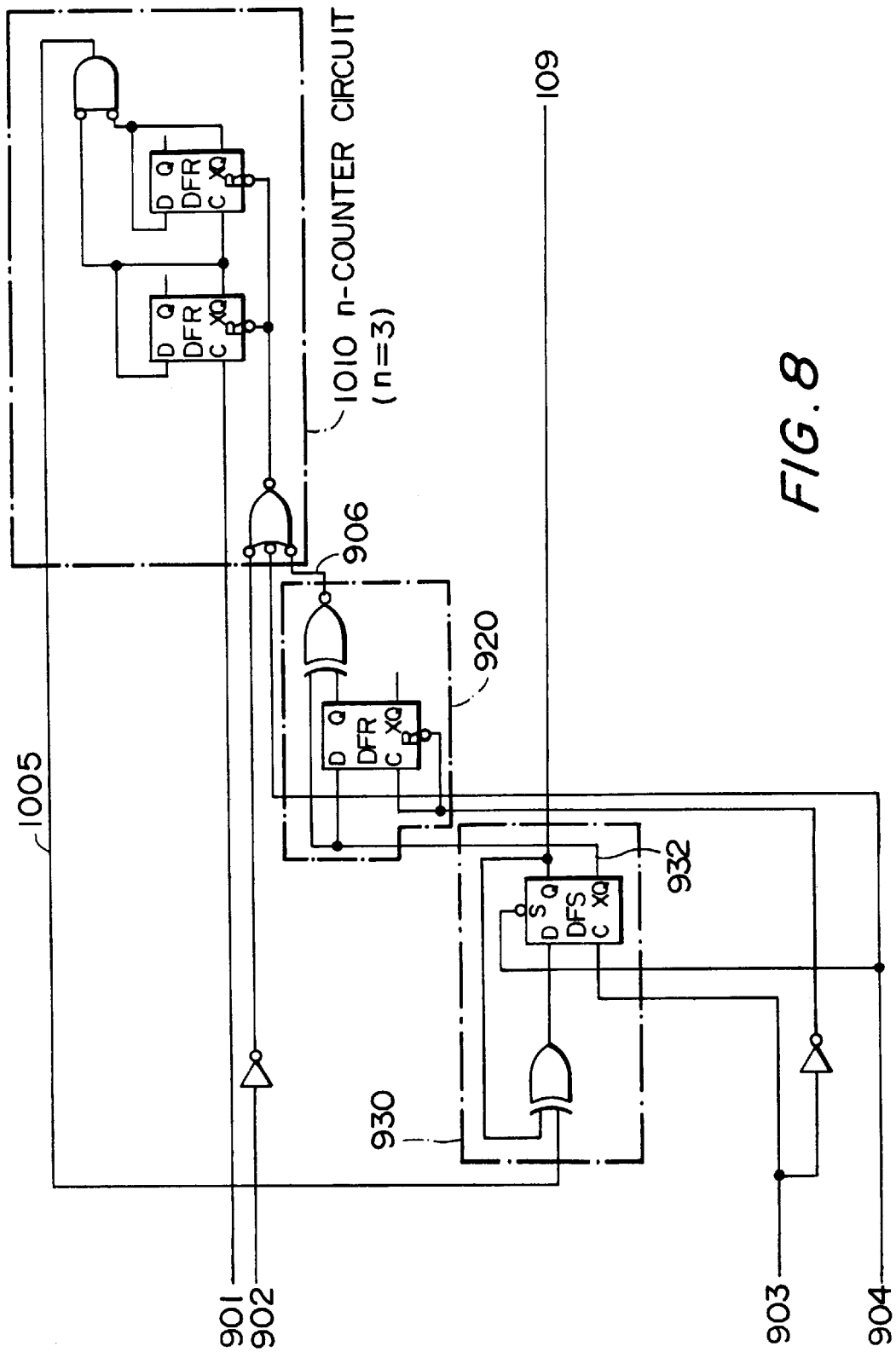
FIG. 8 shows an example of the circuit configuration for outputting the polarity indication signal on the basis of the initial consecutive bits, in the polarity determination section of the data reception device of the second embodiment.

An example of a circuit configuration for outputting the polarity indication signal 109 from the polarity determination section 104 of the data reception device of this second embodiment, on the basis of the initial consecutive bits, is shown in FIG. 8. This circuit causes the polarity indication signal 109 to invert if initial consecutive bits of 00 are detected three times, and comprises an n-counter circuit (where n=3) 1010, a differentiating circuit 920, and a polarity indication signal hold circuit 930. In the same manner as in the first embodiment, reference number 901 denotes a trigger signal that causes a pulse to be output when the initial consecutive bits are 00, 902 denotes a trigger signal that causes a pulse to be output when the initial consecutive bits are 11, 903 denotes a 10-MHz clock signal, 904 denotes a reset signal, and 109 denotes the polarity indication signal.

The initial state of this circuit is such that the count of the n-counter circuit (n=3) 1010 has been reset to zero by the reset signal 904 and the polarity indication signal hold circuit 930 is held in its initial state.

If the initial consecutive bits are 11, the count of the n-counter circuit (n=3) 1010 is reset to zero by the pulse of the trigger signal 902 and thus the level of a signal 1005 that is output from the n-counter circuit (n=3) 1010 goes low. When the polarity indication signal hold circuit 930 receives this low-level signal 1005, it holds the polarity indication signal 109 unchanged and outputs that held polarity indication signal 109. In other words, if the initial consecutive bits are 11, the counter is reset and the polarity indication signal 109 remains unchanged, as shown by 411, 402, and 412 in FIG. 7.

If the initial consecutive bits are 00, the pulse of the trigger signal 901 is input to the n-counter circuit (n=3) 1010 and the count of the n-counter circuit (n=3) 1010 is incremented thereby. This n-counter circuit (n=3) 1010 is configured in such a manner that the signal 1005 that is output therefrom goes high when the count reaches 3, but at all other times this signal 1005 is low. Therefore, when the count is not 3, the signal 1005 that is output from the n-counter circuit (n=3) 1010 is low, so that the polarity indication signal hold circuit 930 holds the polarity indication signal 109 unchanged and outputs the thus held polarity indication signal 109 is output therefrom. In other words, if the initial consecutive bits are 00, the polarity indication signal 109 is held unchanged, as shown by 413, 403, and 414 in FIG. 7.

When the count reaches 3, the signal 1005 that is output from the n-counter circuit (n=3) 1010 goes high. When the polarity indication signal hold circuit 930 receives this high-level polarity indication signal 109, it inverts the polarity indication signal 109 that is currently being held. A low-level pulse is generated in the signal 906 that is output from the differentiating circuit, by a signal 932 of the opposite polarity to that of the polarity indication signal 109, which resets the count of the n-counter circuit (n=3) 1010 to zero. This causes the polarity indication signal hold circuit 930 to hold this inverted polarity indication signal 109 until the initial consecutive bits are next detected to be 00 three times in succession. In other words, if the value in the counter is n (3, in this case), the polarity indication signal 109 is inverted and the counter is reset, as shown by 415, 404, and 416 in FIG. 7.

In this manner, the data reception device of the second embodiment of this invention detects and corrects the polarity identification error concerning the differential signal when the initial consecutive bits are 00 in each of n packets (where n is 3 in FIG. 8) of data received in succession.

The data reception device of this embodiment determines that there is a polarity identification error, if 00 is detected in each of n packets of data received in succession. This makes it possible to eliminate more of the effects of jittering and pulse offset in the signal than is possible with the method that determines incorrect polarity identification from a single packet, such as the data reception device of the first embodiment, as well as noise generated during transmission and signal loss. It is therefore possible to provide a data reception device that accurately corrects polarity identification error with no misoperation.

Third Embodiment

The description now turns to a data reception device that is a third embodiment of this invention, which determines and corrects polarity identification errors when at least one of the following conditions is satisfied: the initial consecutive bits have been detected to be 00 and/or it is detected that the link has not been guaranteed over a specific period of time.

Figure 9:
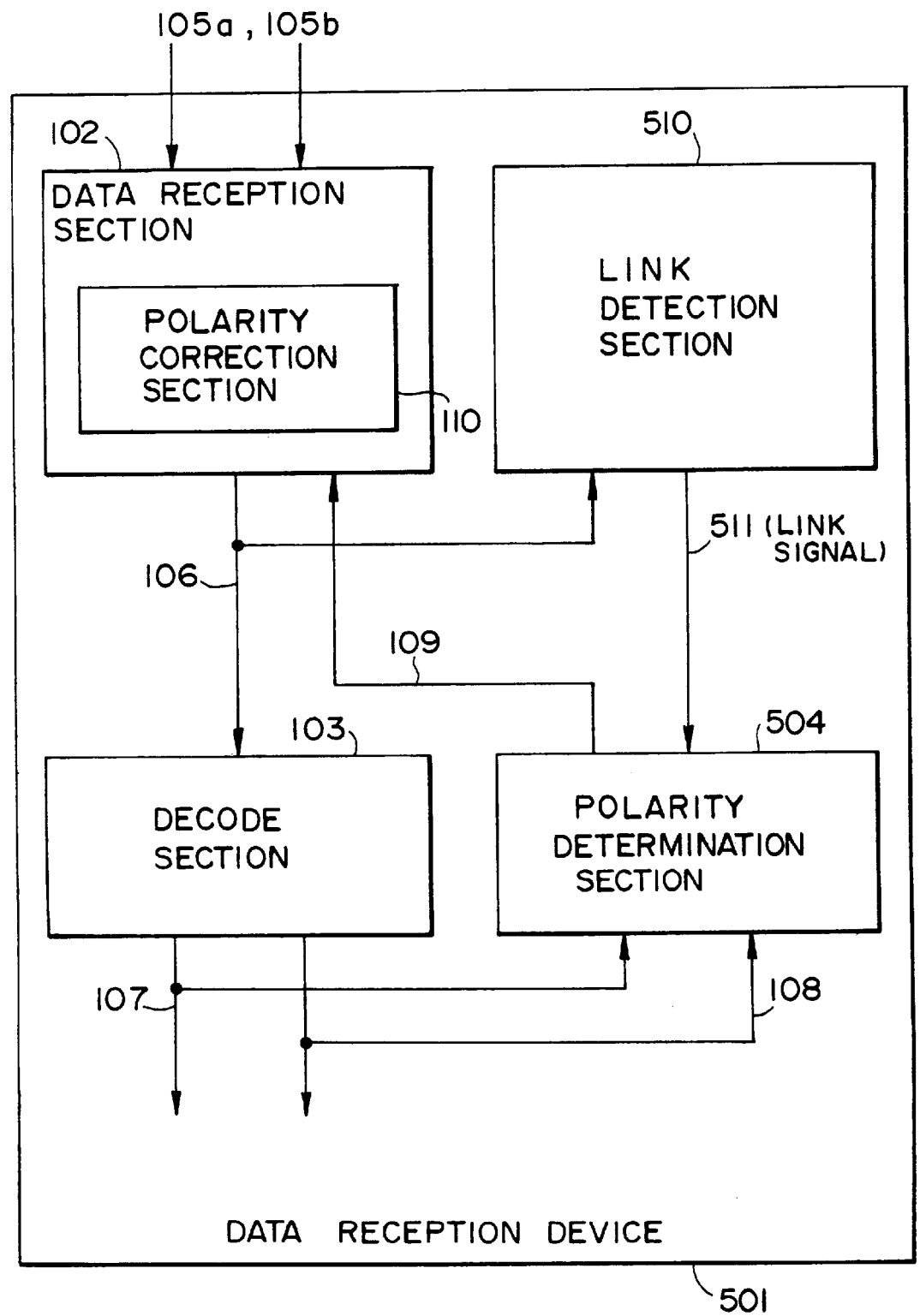
FIG. 9 is a function block diagram of a data reception device in accordance with a third embodiment of this invention.

A function block diagram of a data reception device 501 that is this third embodiment is shown in FIG. 9. This data reception device 501 has the same basic configuration as the data reception device of the first and second embodiments, but with the addition of a link detection section 510. Note that components of this embodiment that have the same functions as components in FIG. 1 are given the same reference numbers in FIG. 9. Similarly, the configuration of components other than the link detection section 510 and a polarity determination section 504 are the same as those of the data reception device 101 of the first embodiment, so further description thereof is omitted.

The data reception device 501 of this embodiment is configured to receive data and link-test pulses in accordance with the previously mentioned standards. Therefore the data reception device 501 can receive a link-test pulse when no data is being received. This link-test pulse is specified by the standards for verifying that a link between the transmitter and the receiver is secure.

Figure 10:
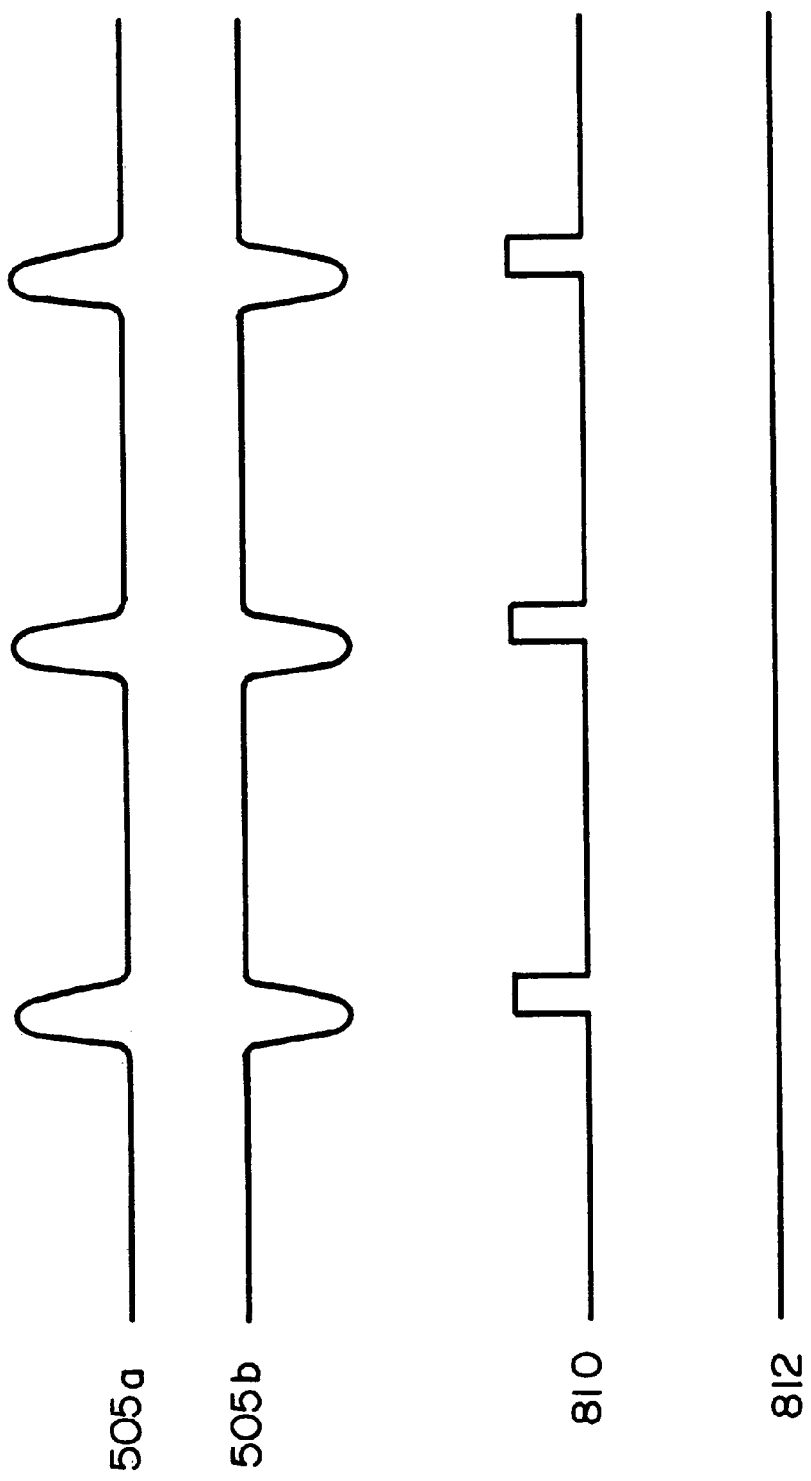
FIG. 10 shows an example of link-test pulses received by the data reception device of the third embodiment, together with an example of a digital signal used for decoding, which is generated from these link-test pulses.

An example of the link-test pulses received by the data reception device 501 of this third embodiment is shown in FIG. 10, together with an example of a digital signal used for decoding, which is generated from these link-test pulses. Each link-test pulse is a positive pulse generated at fixed intervals, as shown by 505a. Note that this signal at portions other than these positive pulses is at an intermediate level.

Signal transfer between this data reception device 501 and the transmitter is by a differential signal line (such as a twisted-pair line), so that, when the transmitter sends link-test pulses they are sent over one of the signal lines of the differential signal line cable, such as the line for the positive-polarity signal of the differential signal, as shown by 505a. Similarly, a signal which is formed by inverting 505a is sent over the other signal line, such as the line for the negative-polarity signal of the differential signal, as shown by 505b.

When the transmission line shown as 505a has been correctly identified as the line carrying the positive-polarity signal, the digital signal 106 generated in the data reception section 102 will contain positive pulses at predetermined intervals, as shown at 810. If, however, the transmission line shown as 505b has been identified as the line carrying the positive-polarity signal, the digital signal 106 generated in the data reception section 102 will be a low-level signal as shown at 812. It is therefore possible to detect that the data reception section 102 has made a polarity identification error from this digital signal 106.

The characteristic components of this embodiment will now be described.

The link detection section 510 receives the digital signal 106 that is output from the data reception section 102. If the polarities of the first and second receive signals have been identified correctly by the data reception section 102, the digital signal 106 appears as shown by 810 in FIG. 10; if they have been identified incorrectly, it appears as shown by 812 in FIG. 10.

Thus, if the digital signal 106 remains low as shown by 812 in FIG. 10 when the link detection section 510 is not receiving data, it is determined that the link has not been guaranteed and thus a negation link signal 511 is output. If the digital signal 106 is detected to have positive pulses at predetermined intervals, as shown by 810 in FIG. 10, and data is being received, an affirmative link signal 511 is output. The output of the affirmative link signal 511 when data is being received is designed to prevent the operation of a link negation time counter circuit, which will be described later with reference to FIG. 12. In this case, the negation link signal 511 is a low-level signal and the affirmative link signal 511 is a high-level signal.

The polarity determination section 504 of this embodiment determines that the polarities have been identified incorrectly if at least one of the following conditions is satisfied: the initial consecutive bits have been detected to be 00 in each of n packets of data received in succession, and the link has not been guaranteed over a specific period of time, on the basis on this link signal 511.

Figure 11:
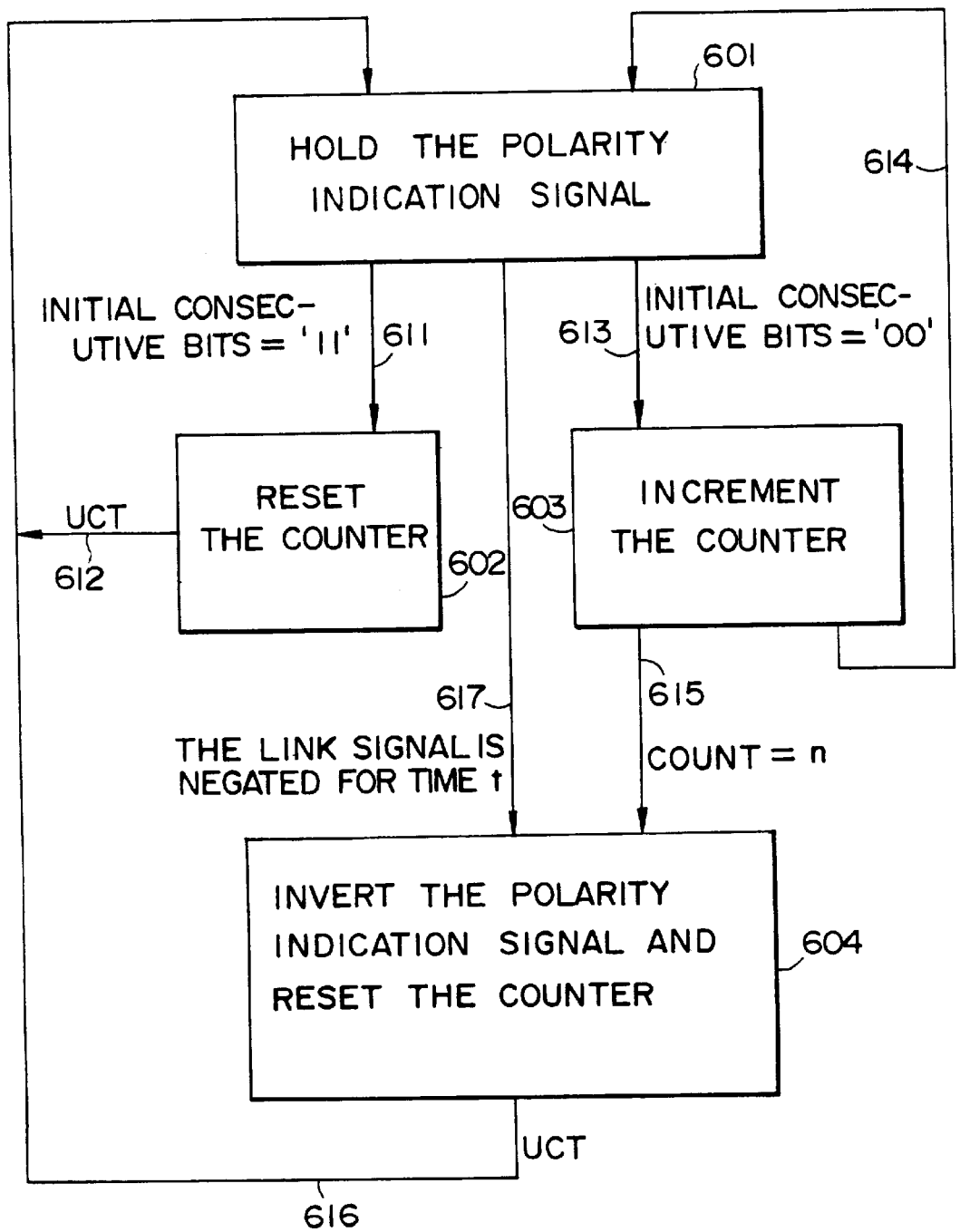
FIG. 11 shows an example of the state transitions in the polarity determination section of the data reception device of the third embodiment.

An example of state transitions in the polarity determination section 504 of the link detection section 510 of this third embodiment is shown in FIG. 11.

The polarity indication signal 109 is configured to have either of two states: a first state and a second state. In a state 601 of rig. 11, the polarity indication signal 109 is maintained in the first state if it is in that first state or it is maintained in the second state if it is in that second state, then the system waits until initial consecutive bits appear and the link signal 511 has been negated for a time t. A state 602 of FIG. 11 resets a counter for counting the number of consecutive times that the initial consecutive bits are 00. A state 603 increments this counter. In a state 604, the polarity indication signal 109 is inverted to the second state if it is in the first state or it is inverted to the first state if it is in the second state, then the counters for counting the number of consecutive times that the initial consecutive bits are 00 and for counting the negation time of the link signal 511 are both reset. UCT is an unconditional transition. The initial state is state 601. The initial value of each of the counters for counting the number of consecutive times that the initial consecutive bits are 00 and for counting the negation time of the link signal 511 is 0.

In state 601, the state changes to state 602 (611) if initial consecutive bits that are data 11 appear. In state 602, the counter for counting the number of consecutive times that the initial consecutive bits are 00 is reset and the state changes unconditionally to state 601 (612). In state 601, the state changes to state 603 (613) if initial consecutive bits that are data 00 appear, and the counter for counting the number of consecutive times that the initial consecutive bits are 00 is incremented. If the resultant value in this counter is not n, the state changes to state 601 (614); if it is n, it changes to state 604 (615).

From state 601, the state changes to state 604 (617) if the counter for counting the negation time of the link signal 511 has detected that the link signal 511 has been negated for a time t.

From state 604, the polarity indication signal 109 is inverted, the counters for counting the number of consecutive times that the initial consecutive bits are 00 and for counting the negation time of the link signal 511 are reset, and the state changes unconditionally to state 601 (616). These state transitions ensure that the polarity indication signal 109 is inverted if at least one of the following conditions is satisfied: the initial consecutive bits in each of n packets of data received in succession are 00, and it is detected that the link has not been guaranteed for a specific period of time based on the link signal 511.

Figure 12:
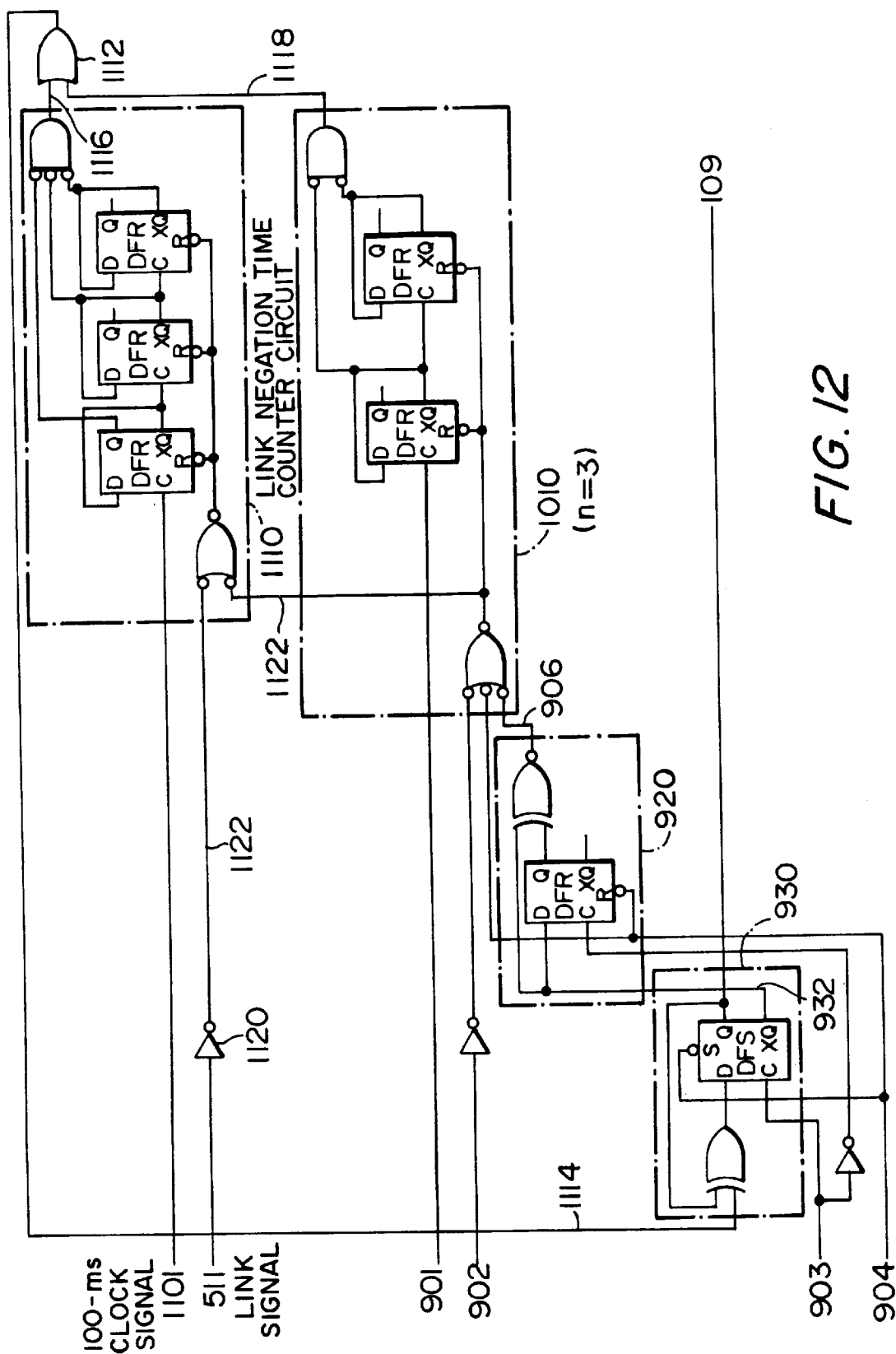
FIG. 12 shows an example of the circuit configuration for outputting the polarity indication signal on the basis of the initial consecutive bits and the time during which the link signal is negated, in the polarity determination section of the data reception device of the third embodiment.

An example of a circuit configuration for outputting the polarity indication signal 109 from the polarity determination section 504 of the data reception device of this third embodiment, on the basis of the initial consecutive bits and the time during which the link signal 511 is negated, is shown in FIG. 12. This circuit causes the polarity indication signal 109 to invert if initial consecutive bits that are 00 have been detected three times in succession and the link signal 511 has been negated for 500 ms. This circuit comprises a link negation time counter circuit 1110, the n-counter circuit (n=3) 1010, the differentiating circuit 920, and the polarity indication signal hold circuit 930. Reference number 1101 denotes a clock signal with a period of 10 C ms, 511 denotes the link signal, 901 denotes a trigger signal that causes a pulse to be output when the initial consecutive bits are 00, 902 denotes a trigger signal that causes a pulse to be output when the initial consecutive bits are 11, 903 denotes a 10-MHz clock signal, 904 denotes a reset signal, and 109 denotes the polarity indication signal.

Note that in this embodiment, the time required to determine link test fail, that is, the time required to decide that the polarities have been reversed by a link test fail, is 500 ms, as specified in the above mentioned standards. The embodiment shown in FIG. 12 comprises three D flip-flop circuits, with the configuration being such that the link negation time counter circuit 1110 which counts to five uses a clock signal 1101 that has a period of 100 ms to measure 500 ms. In this case, the time required to determine link test fail is not limited to 500 ms; it can be any length of time necessary for the determination of link test fail, based on these standards. Similarly, the period of the clock signal 1101 and the count of the link negation time counter circuit 1110 can be set to any suitable values, based on the time required to determine link test fail. The clock signal 1101 also need not to be synchronized with the clock signal 903.

As mentioned previously, the negation link signal 511 is a low-level signal and the affirmative link signal 511 is a high-level signal.

The initial state of this circuit is such that the counts of the link negation time counter circuit 1110 and the n-counter circuit (n=3) 1010 have been reset to zero by the reset signal 904 and the polarity indication signal hold circuit 930 is held in its initial state.

If the initial consecutive bits are 11, the count of the n-counter circuit (n=3) 1010 is reset to zero by the pulse of the trigger signal 902 and thus the level of a signal 1118 that is output from the n-counter circuit (n=3) 1010 goes low. If a signal 1116 that is output from the link negation time counter circuit 1110 is low, a signal 1114 that is output from an OR circuit 1112 goes low and is input to the polarity indication signal hold circuit 930. When the polarity indication signal hold circuit 930 receives this low-level signal 1114, it holds the polarity indication signal 109 unchanged and outputs that held polarity indication signal 109. In other words, if the initial consecutive bits are 11, the counter for counting the number of consecutive times that the initial consecutive bits are 00 is reset and the polarity indication signal 109 remains unchanged, as shown by 611, 602, and 612 in FIG. 11.

If the initial consecutive bits are 00, the pulse of the trigger signal 901 is input to the n-counter circuit (n=3) 1010 and the count of the n-counter circuit (n=3) 1010 is incremented thereby. This n-counter circuit (n=3) 1010 is configured in such a manner that the signal 1118 that is output therefrom goes high when the count reaches 3, but at all other times this signal 1118 is low. Therefore, when the count is not 3, the signal 1118 that is output from the n-counter circuit (n=3) 1010 is low. If the signal 1116 that is output from the link negation time counter circuit 1110 is low, the signal 1114 that is output from the OR circuit 1112 goes low and is input to the polarity indication signal hold circuit 930. The polarity indication signal hold circuit 930 therefore holds the polarity indication signal 109 unchanged and outputs the thus held polarity indication signal 109 is output therefrom. In other words, if the initial consecutive bits are 00, the counter for counting the number of consecutive times that the initial consecutive bits are 00 is incremented and the polarity indication signal 109 is held unchanged, as shown by 613, 603, and 614 in FIG. 11.

When the count reaches 3, the signal 1118 that is output from the n-counter circuit (n=3) 1010 goes high so that the signal 114 that is output from the OR circuit 1112 also goes high. When the polarity indication signal hold circuit 930 receives this high-level signal 1114, it inverts the polarity indication signal 109 that is currently being held. A low-level pulse is generated in the signal 906 that is output from the differentiating circuit 920, by the signal 932 of the opposite polarity to that of the polarity indication signal 109, which resets the count of the n-counter circuit (n=3) 1010 to zero. This causes the polarity indication signal hold circuit 930 to hold this inverted polarity indication signal 109 until the initial consecutive bits are next detected to be 00 three times in succession, or until the link signal 511 has been negated for 500 ms. In other words, if the value in the counter is n (3, in this case), the polarity indication signal 109 is inverted and the counters for counting the number of consecutive times that the initial consecutive bits are 00 and for counting the negation time of the link signal 511 are reset, as shown by 615, 604, and 616 in FIG. 11.

The link negation time counter circuit 1110 is reset if it receives the high-level link signal 511, or if the polarity indication signal 109 is inverted. If the link has not been guaranteed, the link signal 511 is still low so its level is inverted by an inverter 1120 to high and a high-level signal 1122 is thereby input to the link negation time counter circuit 1110. If the link signal 511 does not go high during 500 ms, the link negation time counter circuit 1110 outputs the high-level signal 1116. This makes the signal 1114 that is output from the OR circuit 1112 go high. When the polarity indication signal hold circuit 930 receives this high-level signal 1114, it inverts the polarity indication signal 109 that is currently being held. A low-level pulse is generated in the signal 906 that is output from the differentiating circuit, by a signal 932 of the opposite polarity to that of the polarity indication signal 109, which resets the counts of the n-counter circuit 1010 and negation time counter circuit 1110 to zero. This causes the polarity indication signal hold circuit 930 to hold this inverted polarity indication signal 109 until the initial consecutive bits are next detected to be 00 three times in succession, or until the link signal 511 has again been negated for 500 ms. In other words, if the link signal 511 is negated far a time t (500 ms, in this case), the polarity indication signal 109 is inverted and the counters for counting the number of consecutive times that the initial consecutive bits are 00 and for counting the negation time of the link signal 511 are reset, as shown by 617, 604, and 616 in FIG. 11.

This configuration enables the data reception device of the third embodiment to use the initial consecutive bits to detect any polarity identification error while it is receiving data, or use the link-test pulses to detect any polarity identification error while it is receiving those link-test pulses, and correct that error.

Fourth Embodiment

The description now turns to a data reception device in accordance with a fourth embodiment of this invention, which determines and corrects an incorrect polarity identification, when it has detected that the link has not bean guaranteed for a specific period of time. The data reception device of this embodiment is characterized in using a decoding method that is based on edges of the digital signal, and it is configured to use link-test pulses to detect polarity identification errors.

Figure 13:
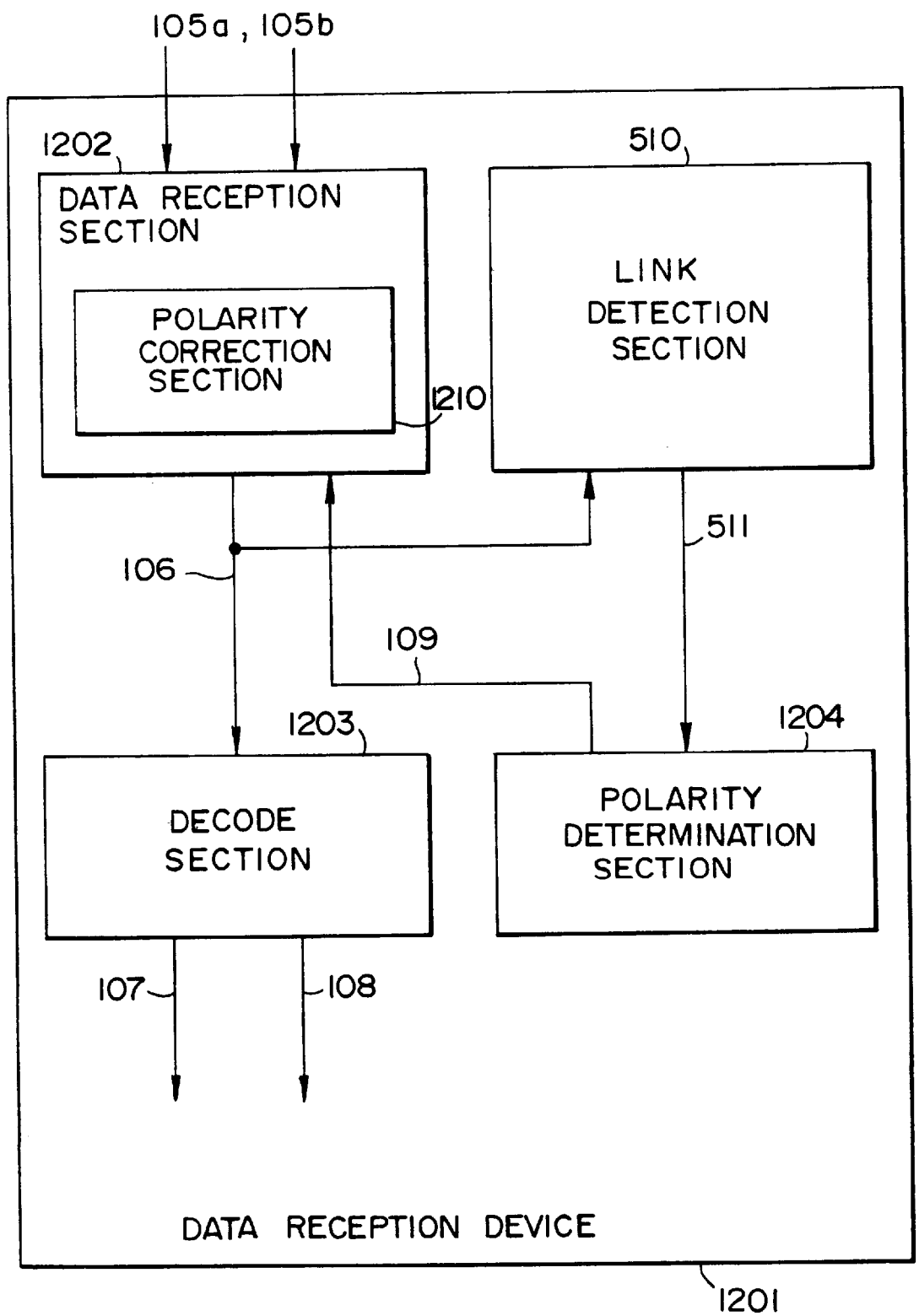
FIG. 13 is a function block diagram of a data reception device in accordance with a fourth embodiment of this invention.

A function block diagram of a data reception device 1201 of the fourth embodiment of this invention is shown in FIG. 13.

This data reception device 1201 comprises a data reception section 1202, a decode section 1203, a link detection section 510, and a polarity determination section 1204. The data reception section 1202 receives paired differential signals 105a and 105b and outputs the digital signal 106 on the basis of these differential signals 105a and 105b. This data reception section 1202 also comprises a polarity correction section 1210 that corrects any error in the polarity identification of the differential signals 105a and 105b, on the basis of the polarity indication signal 109 as will be described later. The decode section 1203 receives the digital signal 106 and generates the bit synchronization signal 107 and the NRZ serial binary data 108 according to edges of the digital signal 106. The link detection section 510 receives the digital signal that is output from the data reception section 1202, determines from this digital signal 106 whether or not the link has been guaranteed, then outputs the link signal 511 in accordance with this determination. The polarity determination section 1204 receives this link signal 511, determines whether or not the data reception section 1202 has identified the polarities of these differential signals 105a and 105b correctly, and outputs the polarity indication signal 109 which has two states.

The configuration of these components are described below in more detail.

The link detection section 510 is configured in a similar manner to the link detection section 510 of the third embodiment and the digital signals that are input thereto is basically the same are those shown by 810 and 812 in FIG. 10.

The polarity determination section 1204 of this embodiment determines that a polarity identification error has been made, when it has detected from the link signal 511 that the link has not been guaranteed for a specific period of time.

Figure 14:
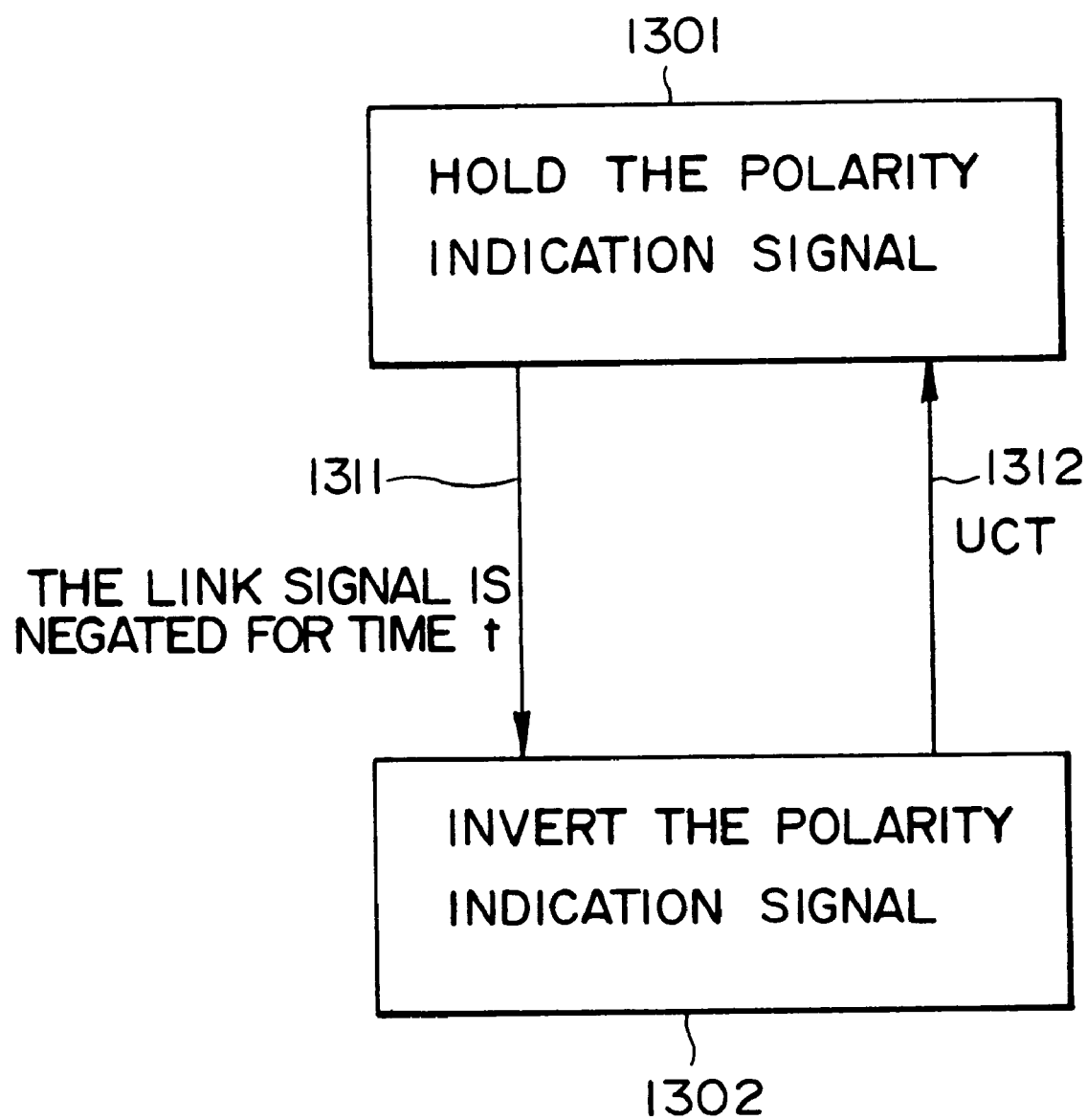
FIG. 14 shows an example of the state transitions in the polarity determination section of the data reception device of the fourth embodiment.

An example of state transitions in the polarity determination section 1204 in the data reception device 1201 of this fourth embodiment is shown in FIG. 14.

The polarity indication signal 109 is configured to have either of two states: a first state and a second state. In a state 1301 of FIG. 14, the polarity indication signal 109 is maintained in the first state if it is in that first state or it is maintained in the second state if it is in that second state, then the system waits until the link signal 511 has been negated for a time t.

A state 1301 detects that the link signal 511 has been negated for the time t, from the counter for counting the negation time of the link signal 511, then changes to a state 1302 (1311).

In state 1302, the polarity indication signal 109 is inverted, the counter for counting the negation time of the link signal 511 is reset, and the state changes unconditionally to state 1301 (1312). These slate transitions ensure that the polarity indication signal 109 is inverted if it has been detected that the link has not been guaranteed for a specific period of time based on the link signal 511.

Figure 15:
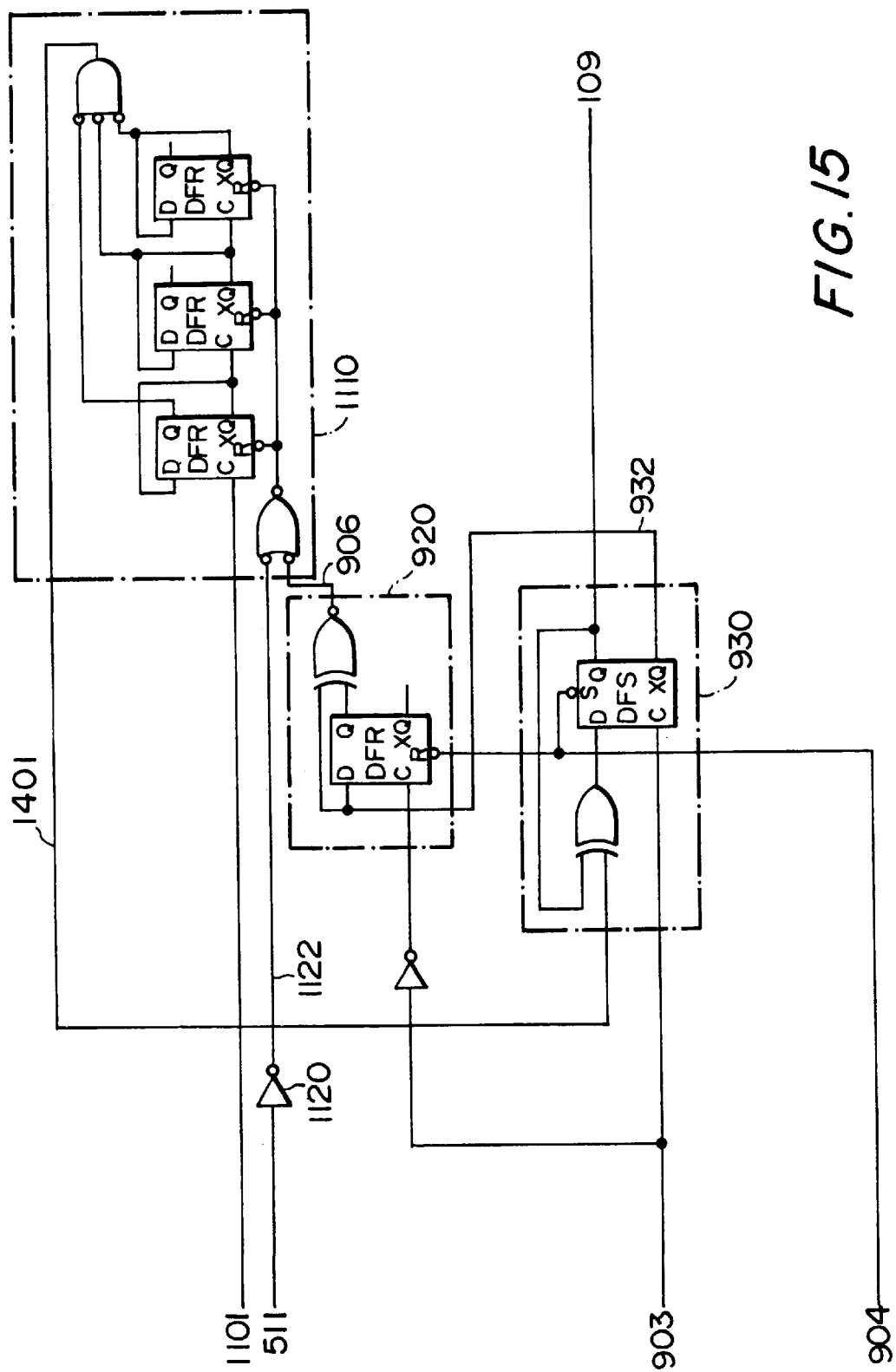
FIG. 15 shows an example of the circuit configuration for outputting the polarity indication signal on the basis of the time during which the link signal is negated, in the polarity determination section of the data reception device of the fourth embodiment.

An example of a circuit configuration for outputting the polarity indication signal 109 from the polarity determination section 1204 shown in FIG. 13 of the data reception device of this fourth embodiment, on the basis of the time during which the link signal 511 is negated, is shown in FIG. 15. This circuit causes the polarity indication signal 109 to invert if the link signal 511 has been negated for 500 ms. This circuit comprises the link negation time counter circuit 1110, the differentiating circuit 920, and the polarity indication signal hold circuit 930. Reference number 1101 denotes a clock signal with a period of 100 ms, 511 denotes the link signal, 903 denotes a 10-MHz clock signal, 904 denotes a reset signal, and 109 denotes the polarity indication signal.

As mentioned previously, the negation link signal 511 is a low-level signal and the affirmative link signal 511 is a high-level signal.

The initial state of this circuit is such that the count of the link negation time counter circuit 1110 has been reset to zero by the reset signal 904 and the polarity indication signal hold circuit 930 is held in its initial state.

The link negation time counter circuit 1110 is reset if it receives the high-level link signal 511, or if the polarity indication signal 109 is inverted. If the link has not been guaranteed, the link signal 511 is still low so its level is inverted by the inverter 1120 to high and a high-level signal 1122 is thereby input to the link negation time counter circuit 1110. If the link signal 511 does not go high during 500 ms, the link negation time counter circuit 1110 outputs a high-level signal 1401. This makes the polarity indication signal hold circuit 930 invert the polarity indication signal 109 that is currently being held. A low-level pulse is generated in the signal 906 that is output from the differentiating circuit 920, by a signal 932 of the opposite polarity to that of the polarity indication signal 109, which resets the count of the negation time counter circuit 1110 to zero. This causes the polarity indication signal hold circuit 930 to hold this inverted polarity indication signal 109 until the link signal 511 has again been negated for 500 ms. In other words, if the link signal 511 is negated for a time t (500 ms, in this case), the polarity indication signal 109 is inverted and the counter for counting the negation time of the link signal 511 is reset, as shown by 1301, 1311, 1302, and 1312 in FIG. 14.

The description now turns to the configuration of the decode section 1203 shown in FIG. 13. The decode section 1203 of this embodiment generates the bit synchronization signal 107 and the serial NRZ binary data 108 according to edges of the digital signal 106.

Figure 16:
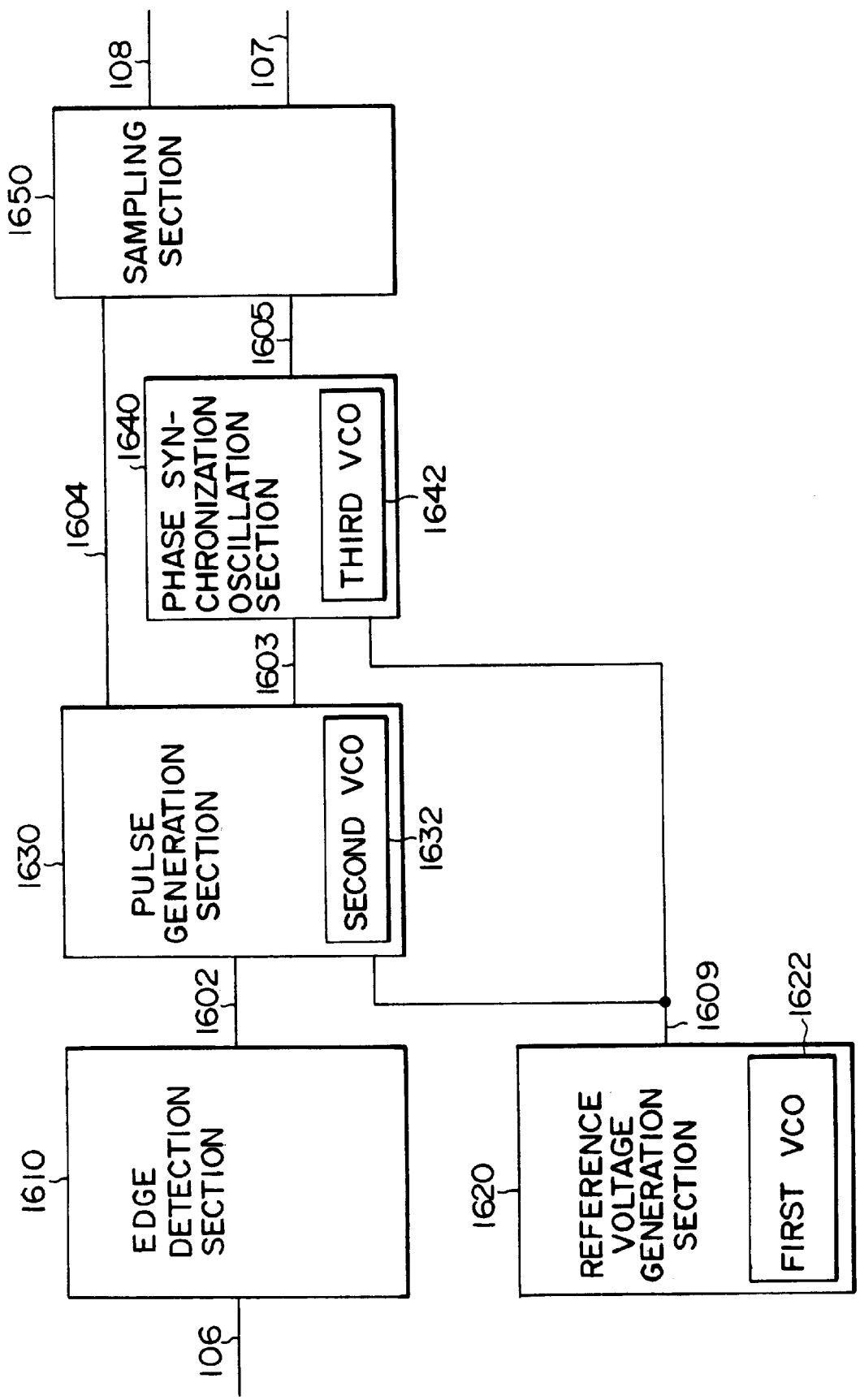
FIG. 16 is a function block diagram of the decode section.
Figure 17:
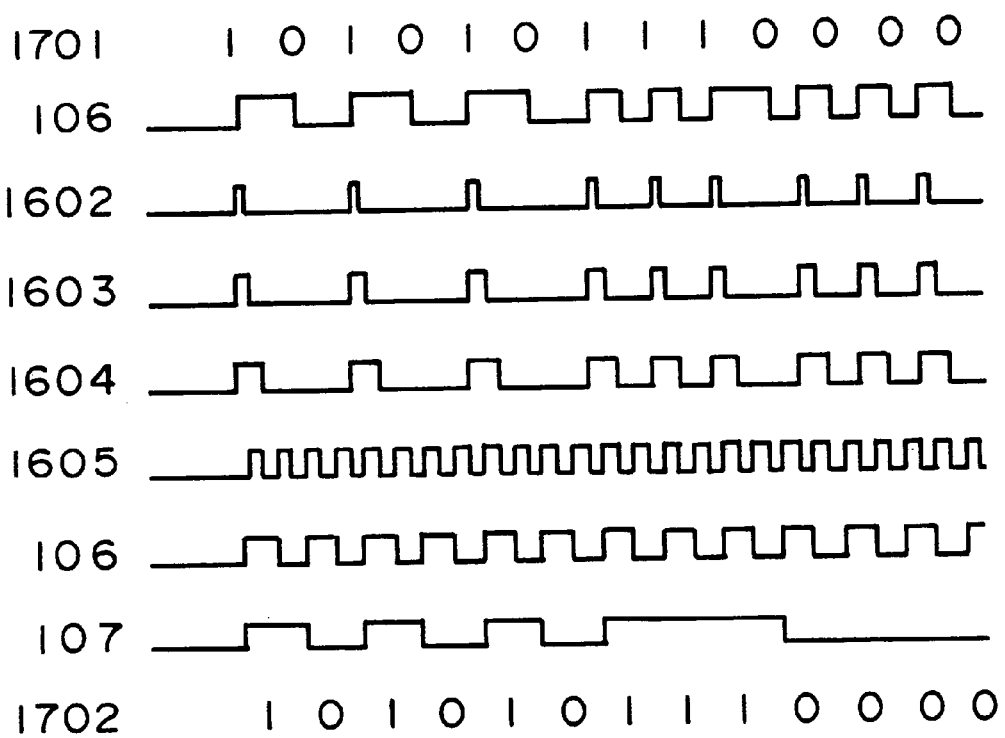
FIG. 17 is a timing chart of this decode section.

A function block diagram of this decode section 1203 is shown in FIG. 16 and a timing chart thereof is shown in FIG. 17. Each signal in FIG. 17 corresponds to the equivalent signal in FIG. 16. Reference number 1701 in FIG. 17 denotes data to be transferred, 106 denotes the input signal, and 1702 denotes decoded data.

As shown in FIG. 16, the decode section 1203 comprises an edge detection section 1610, a reference voltage generation section 1620, a pulse generation section 1630, a phase synchronization oscillation section 1640, and a sampling section 1650.

The edge detection section 1610 receives the digital signal 106. The edge detection section 1610 is a differentiating circuit for detecting edges of the digital signal 106. It detects each rising edge of the digital signal 106 and generates an edge detection output signal 1602. This edge detection output signal 1602 acts as a trigger input for the pulse generation section 1630.

The reference voltage generation section 1620 comprises a first voltage control oscillator (hereinafter abbreviated to VCO) 1622 which oscillates at a frequency that is 2n times the data transfer frequency fs and outputs a reference voltage 1609. The first VCO 1622 has a function (hereinafter called a restart function) that enables control over the stopping and starting of oscillation as specified by a operation control input signal (not shown in the figure), and is controlled so that it is always oscillating while the system is operating.

The reference voltage generation section 1620 causes the first VCO 1622 to oscillate at a frequency that is 2n times the data transfer frequency fs and at the same time outputs a voltage that is dependent on the control voltage (or the control voltage itself) as the reference voltage 1609.

The pulse generation section 1630 comprises a second VCO 1632 and outputs a digital signal regeneration signal 1604 of a pulse width that is approximately 1/(2×fs), where fs is the data transfer frequency, and a phase-comparison timing signal 1603 of a pulse width that is approximately 1/(4×fs) (see FIG. 17).

The phase synchronization oscillation section 1640 comprises a third VCO 1642. It oscillates at 2n times the data transfer frequency fs in the same phase as the phase-comparison timing signal 1603 and outputs a phase synchronization signal 1605 (see FIG. 17).

The second VCO 1632 of the pulse generation section 1630 and the third VCO 1642 of the phase synchronization oscillation section 1640 have the same configuration and the same restart function as the first VCO 1622. A voltage based on the reference voltage 1609 which is dependent on the control voltage of the first VCO 1622, is used as a control voltage for the second VCO 1632 and third VCO 1642.

Since the reference voltage 1609 is used as a control voltage for the second VCO 1632 in the thus-configured pulse generation section 1630, the second VCO 1632, which is provided with the restart function, oscillates at 2n times the data transfer frequency fs. It is therefore possible to generate a signal with a highly accurate pulse width, in a simple manner, by means such as dividing the oscillation output.

Since a voltage based on the reference voltage 1609 is used as the control voltage for the third VCO 1642 in the phase synchronization oscillation section 1640, the self-oscillation frequency of the third VCO 1642 is basically identical to 2n times the data transfer frequency fs. Bit synchronization can therefore be achieved by simply matching phase with the phase-comparison timing signal 1603, so that bit synchronization can be implemented rapidly.

The sampling section 1650 outputs a signal obtained by dividing the phase synchronization signal 1605 by 2n, as the bit synchronization signal 107. This bit synchronization signal 107 is used to sample the digital signal regeneration signal 1604 which is output from the pulse generation section, and thus output the NRZ serial binary data 108 (see FIG. 17).

It should be noted that, although the edge detection section 1610 outputs the edge detection output signal 1602 in synchronization with the rising edge of the digital signal 106 in FIG. 17, the edge detection output signal 1602 could equally well be output in synchronization with either the rising edge or the falling edge of the digital signal 106. Similarly, the phase-comparison timing signal 1603 and the digital signal regeneration signal 1604 that are output from the pulse generation section 1630 could also be in synchronization with either the rising edge or the falling edge of the edge detection output signal 1602.

Furthermore, the phase differences of the phase-comparison timing signal 1603 and the digital signal regeneration signal 1604 with respect to the edge detection output signal 1602 are not limited to those shown in FIG. 17. In other words, it is important, when generating the phase-comparison timing signal 1603 of a pulse width of approximately 1/(4×fs) and the digital signal regeneration signal 1604 of a pulse width of approximately 1/(2×fs) in synchronization with the edge detection output, to ensure that the timing of the rising or falling edge of the phase-comparison timing signal 1603 of a Pulse width of approximately 1/(4×fs) lies within a central area of the pulse width of the digital signal regeneration signal 1604, which is approximately 1/(2×fs).

In this case, since the phase-comparison timing signal 1603 in this decode section 1203 is generated according to edges of the digital signal 106 and the digital signal 106 has at least one frequency component at half the data transfer frequency fs, bit synchronization can be achieved directly, even when the same codes occur in sequence.

Since this decode section 1203 also uses the bit synchronization signal 107 synchronized with the phase-comparison timing signal 1603 having a pulse width of approximately 1/(4×fs) to sample the digital signal regeneration signal 1604 of a pulse width of approximately 1/(2×fs), a digital signal 106 that is jittering by up to approximately ±1/(4×fs) can still be decoded accurately.

This configuration makes it possible for the decode section 1203 of this embodiment to generate the bit synchronization signal 107 and the NRZ serial binary data 108 on the basis of edges of the digital signal 106.

This decode section 1203 also uses the bit synchronization signal 107 to sample the digital signal regeneration signal 1604 which has been generated from the digital signal 106. This has the effect of removing the need for a high level of accuracy in the comparator used in the data reception section 1202 for converting the differential signals 105a and 105b into the digital signal 106. The level of accuracy of the comparator is determined on factors such as the response speed/frequency characteristic thereof and the threshold potential used during the digitization of the signal.

Figure 18:
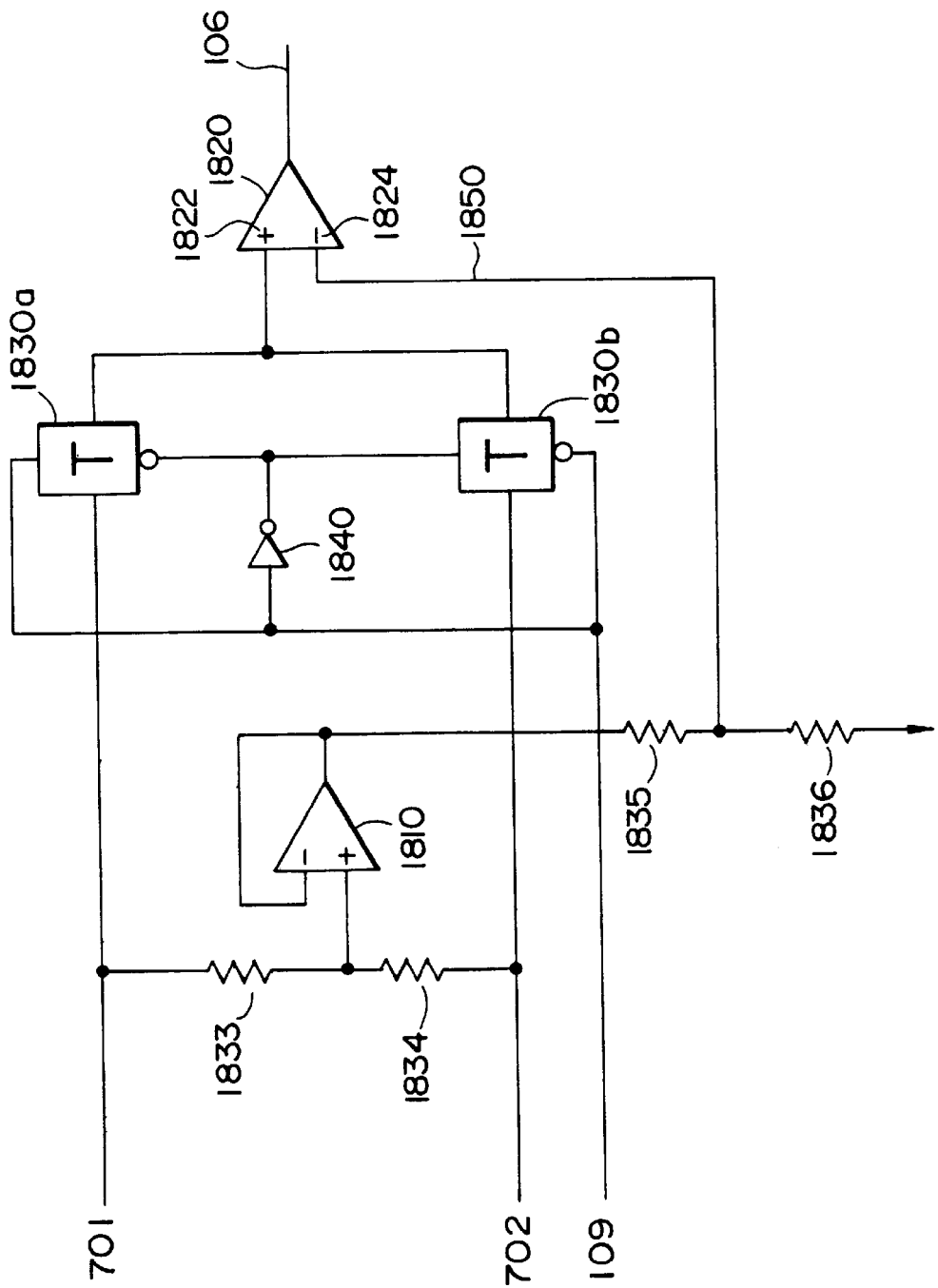
FIG. 18 shows the circuitry of the data reception section in a data reception device in accordance with a fifth embodiment.

The data reception section 1202 of this embodiment uses the configuration described below. An example of the circuitry in the data reception section 1202 of FIG. 13 is shown in FIG. 18. This circuit comprises transmission gates 1830a and 1830b, an op amp 1810, a comparator 1820, and an inverter 1840.

Reference number 701 denotes the first receive signal and 702 denotes the second receive signal, and it is assumed that the differential signal which is input to the first terminal of the two terminals of the data reception device 1201 is the first receive signal 701 and the differential signal which is input to the second terminal is the second receive signal 702. Reference number 109 denotes the polarity indication signal that is output by the polarity determination section 1204.

The description now concerns the generation of a comparison input potential 1850 which will be input to a negative-polarity input terminal 1824 of the comparator 1820 for generating the digital signal 106. First of all, the central potential of the first and second receive signals 701 and 702 is obtained by resistors 1833 and 1834. After passing through a voltage follower configured of the op amp 1810, that potential is further divided by resistors 1835 and 1836 Lo generate a potential that is offset from the central potential of the first and second receive signals 701 and 702, which is used as the comparison input potential 1850.

The comparator 1820 compares this comparison input potential 1850 which is input to the negative-polarity input terminal 1824 with either one of first or second receive signals 701 and 702 which is input to the positive-polarity input terminal 1822, amplifies the difference therebetween, and outputs it.

In this circuit, the digital signal 106 to be input to the decode section 1203 is generated on the basis of transitions in potential at the centers of the bit intervals of the signal which is input to the positive-polarity input terminal 1822 of the comparator 1820. This means that the state of the data reception section 1202 in which the polarities of the differential signal have been identified incorrectly is a state in which the negative-polarity signal is being input to the positive-polarity input terminal 1822 of the comparator. In this case, this circuit operates as described below on the basis of the level of the polarity indication signal 109, to correct the situation so that the positive-polarity signal is input to the positive-polarity input terminal 1822 of the comparator 1820.

In other words, when the polarity indication signal 109 is high, the transmission gate 1830a turns on and 1830b turns off. Thus the first receive signal 701 is input to the positive-polarity input terminal 1822 of the comparator 1820 to generate the digital signal 106.

When the polarity indication signal 106 goes low, the transmission gate 1830a turns off and 1830b turns on. In this case, the second receive signal 702 is input to the positive-polarity input terminal 1822 of the comparator 1820 to generate the digital signal 106.

If it is determined that the data reception section 1202 has identified the polarities incorrectly, that is, if the negative-polarity signal is being input to the positive-polarity input terminal 1822 of the comparator 1820, the polarity determination section 1204 inverts the level of the polarity indication signal 109, as previously described with reference to FIG. 14. When this inversion of the polarity indication signal 109 takes effect, the on/off states of the transmission gates 1830a and 1830b are reversed, which inverts the choice of signal which is input to the positive-polarity input terminal 1822 of the comparator 1820. That is, the positive-polarity signal is now input to the positive-polarity input terminal 1822 of the comparator 1820.

This configuration enables the data reception device of this fourth embodiment to determine whether the polarities of the differential signal have been identified incorrectly, and correct them.

Figure 19:
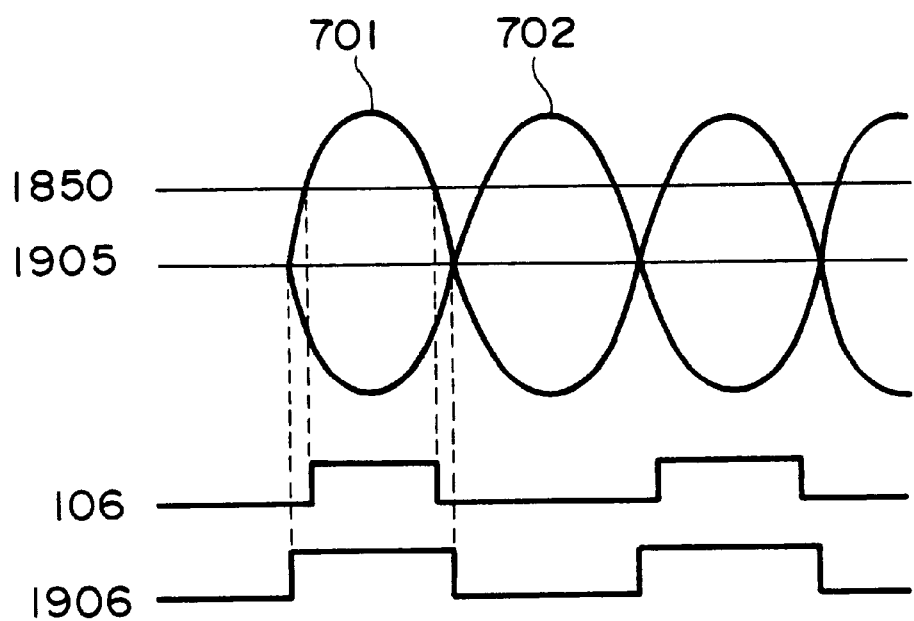
FIG. 19 is a timing chart of the circuitry of FIG. 18.

A timing chart of the circuit of FIG. 18 is shown in FIG. 19. Reference number 1905 denotes the central potential of the first and second receive signals 701 and 702. The comparison input potential 1850 is an offset potential that adds an offset to this central potential 1905. The digital signal 106 is the output of the comparator 1820, when the comparison input potential 1850 has been compared with the first or second receive signal (701 or 702). Inputting the comparison input potential 1850 to the comparator 1820 in this manner makes it possible to ensure that the digital signal 106 which is output from the comparator is not affected by any noise in the receive signal which is distorting its normal amplitude, enabling an increase in noise resistance.

Reference number 1906 denotes a digital signal that is an ideal comparator output obtained by comparison of the first and second receive signals 701 and 702. Since the digital signal 106 is output after comparison with the comparison input potential 1850 in this case, it has a pulse width that is narrower than that of the ideal comparator output 1906. However, the capabilities of the decode section 1203 of the data reception device 1201 of this embodiment are not affected by this narrower pulse width of the digital signal 106. This is because the decode section 1203 generates the digital signal regeneration signal 1604 from the digital signal 106 that is the comparator output, and samples that digital signal regeneration signal 1604.

Thus the data reception section 1202 of a simple configuration can generate the digital signal 106 which has a higher resistance to small-amplitude noise.

Fifth Embodiment

The description now turns to a data reception device that uses a link integrity test function in the detection of whether the link has not been guaranteed for a specific period of time, as a fifth embodiment of this invention. This link integrity test function checks a link which is characteristic of a physical layer and specified by data-transfer standards.

If the link is normally guaranteed by the link integrity test function defined by these standards, a corresponding point in a Link Integrity Test Function State Diagram lies within a Link Test Pass state (hereinafter called a link state); all other cases lie within a link test fail state. These standards define a number of states other than the link state, but in this document all of these many states are handled as a single link test fail state.

The data reception device of this fifth embodiment implements the use of the results of a link integrity test in the detection of link-test pulses within the link detection section 510 of the data reception device of the fourth embodiment. That is, the configuration could be such that this link integrity test uses the digital signal 106 which is the output of the data reception device 1201, and outputs the negation link signal 511 if the result indicates the link test fail state or the affirmative link signal 511 if the result indicates the link state.

This use of the link integrity test function by the present invention makes it possible to provide a data reception device that has a simple configuration and uses the link integrity test function to determine polarity even when no data is arriving.

Sixth Embodiment

Use of the data reception device of this invention in various types of electronic equipment makes it possible to provide electronic equipment that can automatically adjust itself so that polarities are identified correctly, even if the physical connection between signal lines of two signals in a differential pair and the two terminals provided on the electronic equipment for receiving these signals is reversed.

Figure 20:
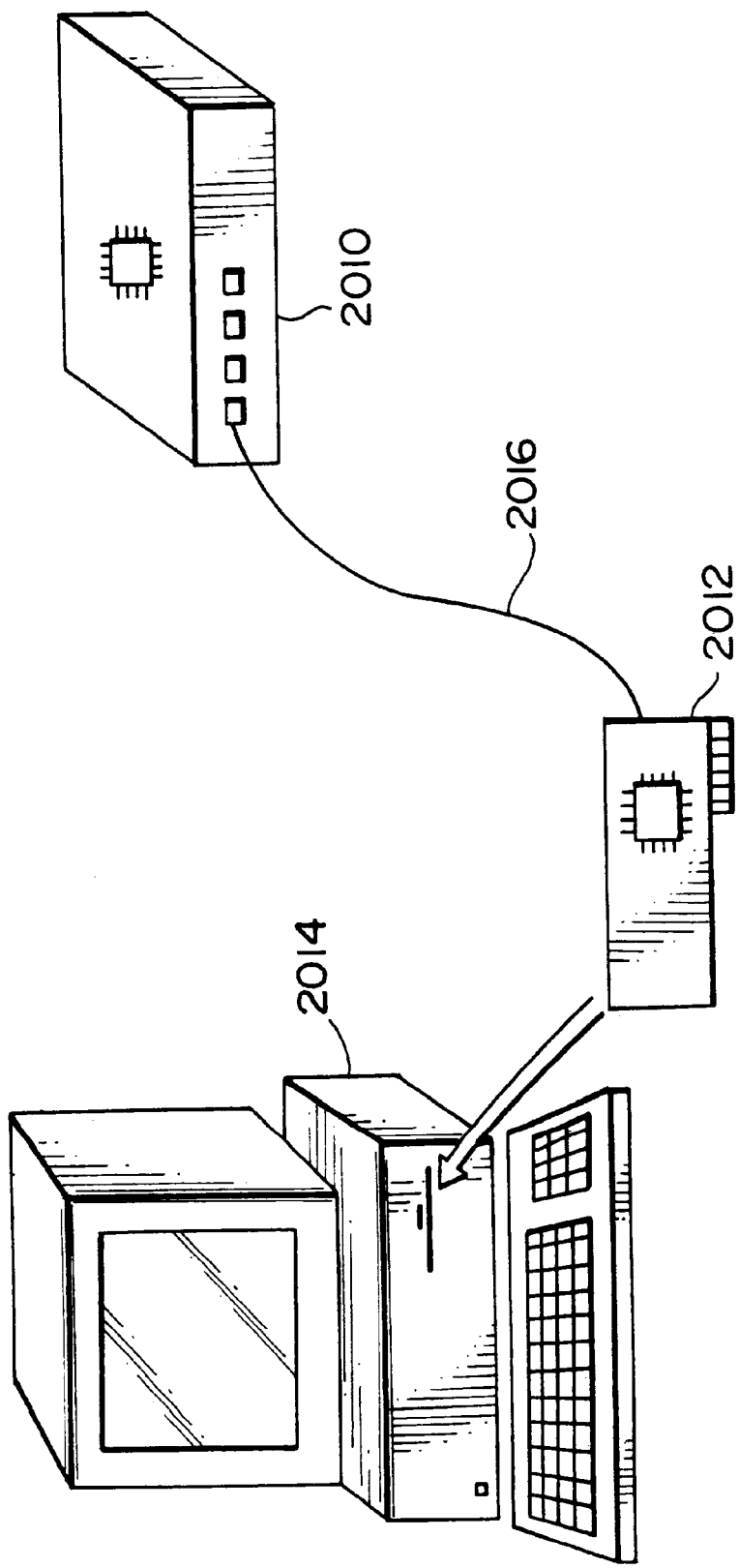
FIG. 20 shows an example of the use of the data reception device of this invention in an Ethernet switch hub and a PC card.

An example of the use of the data reception device of this invention in an Ethernet switch hub and a PC card is shown in FIG. 20. This figure shows how a PC card 2012 installed in a personal computer is connected to one terminal of a switch hub 2010 by a cable 2016.

A function block diagram of this PC card 2012 is shown in FIG. 21. The PC card 2012 comprises pulse transformers 2104 and 2106, filters 2108 and 2110, a data transmission device 2112, a data reception device 2114, a control section 2116, and memory 2118. The data reception device of this invention is used in the data reception device 2114.

The PC card 2012 receives signals from a network 2102. The pulse transformer 2106 and filter 2110 generate a Return to Zero (RZ) signal 2122 (differential signal) from these receive signals. The data reception device 2114 receives that RZ signal 2122 and decodes it into NRZ data 2124. The control section 2116 receives that NRZ data 2124 and outputs it to the memory 2118 and an external PC bus 2120.

It should be noted that the data reception device of this invention can also be applied to any communications equipment that receives a differential signal.

Note also that the data reception device of this invention should not be taken as being limited to any of the above six embodiments; it can be embodied in many different ways.

For example, the configuration of the data reception section and decode section described as the fourth embodiment could equally well be applied to any of the first to third embodiments. Similarly, the link integrity test function described with reference to the fifth embodiment could equally well be applied to the third embodiment.

What is claimed is:

1. A data reception device for receiving packetized data in the form of a differential signal which is formed by a positive-polarity signal and a negative-polarity signal, said data reception device comprising:

a data reception means for generating a digital signal based on said differential signal;

decode means for generating a bit synchronization signal and serial binary data based on said digital signal; and polarity determination means for using said bit synchronization signal to sample said serial binary data that is output by said decode means and determine on the basis of the thus sampled data whether or not said data reception means has correctly identified the polarities of said differential signal;

wherein said polarity determination means determines that the polarities of said differential signal have been identified incorrectly, when the first consecutive pair of identical bits within a received packet of data is detected to be 00; and wherein said data reception means comprises correction means for ensuring that said polarities are identified correctly, when said polarity determination means has determined that said polarities of said differential signal have been identified incorrectly.

2. A data reception device for receiving packetized data in the form of a differential signal which is formed by a positive-polarity signal and a negative-polarity signal, said data reception device comprising:

a data reception means for generating a digital signal based on said differential signal;

decode means for generating a bit synchronization signal and serial binary data based on said digital signal; and polarity determination means for using said bit synchronization signal to sample said serial binary data that is output by said decode means and determine on the basis of the thus sampled data whether or not said data reception means has correctly identified the polarities of said differential signal;

wherein said polarity determination means determines that the polarities of said differential signal have been identified incorrectly, when the first consecutive pair of identical bits within each of n packets of data received in succession is detected to be 00; and wherein said data reception means comprises correction means for ensuring that said polarities are identified correctly, when said polarity determination means has determined that said polarities of said differential signal have been identified incorrectly.

3. A data reception device for receiving packetized data in the form of a differential signal which is formed by a positive-polarity signal and a negative-polarity signal, said data reception device comprising:

a data reception means for generating a digital signal based on said differential signal;

decode means for generating a bit synchronization signal and serial binary data based on said digital signal;

link detection means for detecting whether or not a link which is characteristic of a physical layer has been guaranteed, on the basis of said digital signal generated by said data reception means; and polarity determination means for using said bit synchronization signal to sample said seriel binary data that is output by said decode means and thereby determine whether or not said data reception means has identified the polarities of said differential signal correctly, on the basis of said sampled data and the detection result of said link detection means;

wherein said polarity determination means determines that the polarities of said differential signal have been identified incorrectly when at least one of the following conditions is satisfied: the first consecutive pair of identical bits in each of n packets of data received in succession is detected to be 00, and it is detected that the link has not been guaranteed over a specific period of time, on the basis of the detection result of said link detection means; and wherein said data reception means comprises correction means for ensuring that said polarities are identified correctly, when said polarity determination means has determined that said polarities of said differential signal have been identified incorrectly.

4. The data reception device as defined in claim 3, wherein said link detection means comprises means for detecting a link test fail state by testing link integrity, and wherein said polarity determination means determines that the polarities of said differential signal have been identified incorrectly, when at least one of the following conditions is satisfied: the first consecutive pair of identical bits within each of n packets of data received in succession is detected to be 00, and said link test fail state has been detected to continue for a specific period of time.

5. The data reception device as defined in claim 2, wherein said polarity determination means omits subsequent polarity determinations when the first consecutive pair of identical bits within each of n packets of data received in succession is detected to be 00.

6. The data reception device as defined in claim 3, wherein said polarity determination means omits subsequent polarity determinations when the first consecutive pair of identical bits within each of n packets of data received in succession is detected to be 00.

7. The data reception device as defined in claim 1, wherein said polarity determination means omits this and subsequent polarity determinations when the first consecutive pair of identical bits within each of n packets of data received in succession is detected to be 11.

8. The data reception device as defined in claim 3, wherein said polarity determination means omits this and subsequent polarity determinations when the first consecutive pair of identical bits within each of n packets of data received in succession is detected to be 11.

9. The data reception device as defined in claim 1, wherein said decode means generates said bit synchronization signal and said serial binary data according to edges of said digital signal.

10. The data reception device as defined in claim 2, wherein said decode means generates said bit synchronization signal and said serial binary data according to edges of said digital signal.

11. The data reception device as defined in claim 3, wherein said decode means generates said bit synchronization signal and said serial binary data according to edges of said digital signal.

12. The data reception device as defined in claim 9, wherein data reception means generates a comparison input potential on the basis of said differential signal, then generates said digital signal on the basis of said comparison input potential and the potential of one of said positive-polarity and negative-polarity signals which form said differential signal.

13. The data reception device as defined in claim 10, wherein data reception means generates a comparison input potential on the basis of said differential signal, then generates said digital signal on the basis of said comparison input potential and the potential of one of said positive-polarity and negative-polarity signals which form said differential signal.

14. The data reception device as defined in claim 11, wherein data reception means generates a comparison input potential on the basis of said differential signal, then generates said digital signal on the basis of said comparison input potential and the potential of one of said positive-polarity and negative-polarity signals which form said differential signal.

15. A data reception device for receiving packetized data in the form of a differential signal which is formed by a positive-polarity signal and a negative-polarity signal, said data reception device comprising:

a data reception means for generating a digital signal based on said differential signal;

decode means for generating a bit synchronization signal and serial binary data according to edges of said digital signal;

link detection means for detecting whether or not a link which is characteristic of a physical layer has been guaranteed, on the basis of said digital signal generated by said data reception means; and polarity determination means for determining whether or not said data reception means has correctly identified the polarities of said differential signal, on the basis of the detection result of said link detection means;

wherein said polarity determination means determines that the polarities of said differential signal have been identified incorrectly, when it is detected that the link has not been guaranteed over a specific period of time on the basis of the detection result of said link detection means; and wherein said data reception means comprises correction means for ensuring that said polarities are identified correctly, when said polarity determination means has determined that said polarities of said differential signal have been identified incorrectly.

16. The data reception device as defined in claim 15, wherein said data reception means generates a comparison input potential on the basis of said differential signal, and generates a digital signal based on said comparison input potential and the potential of one of said positive-polarity and negative-polarity signals which form said differential signal.

17. The data reception device as defined in claim 15, wherein said link detection means comprises means for detecting a link test fail state by testing link integrity, and wherein said polarity determination means determines that the polarities of said differential signal have been identified incorrectly, when said link test fail state has been detected to continue for a specific period of time.

18. The data reception device as defined in claim 16, wherein said link detection means comprises means for detecting a link test fail state by testing link integrity, and wherein said polarity determination means determines that the polarities of said differential signal have been identified incorrectly, when said link test fail state has been detected to continue for a specific period of time.

19. The data reception device as defined in claim 1, wherein said polarity determination means outputs a polarity indication signal having one of a first state and a second state, on the basis of a determination as to whether or not the polarities of said differential signal have been identified correctly; and wherein said data reception means having a first terminal and a second terminal for receiving said differential signal, regards a signal input into said first terminal to have positive polarity and a signal input into said second terminal to have negative polarity when said polarity indication signal is in said first state, or regards a signal input into said first terminal to have negative polarity and a signal input into said second terminal to have positive polarity when said polarity indication signal is in said second state, in order to generate a digital signal.

20. The data reception device as defined in claim 2, wherein said polarity determination means outputs a polarity indication signal having one of a first state and a second state, on the basis of a determination as to whether or not the polarities of said differential signal have been identified correctly; and wherein said data reception means having a first terminal and a second terminal for receiving said differential signal, regards a signal input into said first terminal to have positive polarity and a signal input into said second terminal to have negative polarity when said polarity indication signal is in said first state, or regards a signal input into said first terminal to have negative polarity and a signal input into said second terminal to have positive polarity when said polarity indication signal is in said second state, in order to generate a digital signal.

21. The data reception device as defined in claim 3, wherein said polarity determination means outputs a polarity indication signal having one of a first state and a second state, on the basis of a determination as to whether or not the polarities of said differential signal have been identified correctly; and wherein said data reception means having a first terminal and a second terminal for receiving said differential signal, regards a signal input into said first terminal to have positive polarity and a signal input into said second terminal to have negative polarity when said polarity indication signal is in said first state, or regards a signal input into said first terminal to have negative polarity and a signal input into said second terminal to have positive polarity when said polarity indication signal is in said second state, in order to generate a digital signal.

22. The data reception device as defined in claim 15, wherein said polarity determination means outputs a polarity indication signal having one of a first state and a second state, on the basis of a determination as to whether or not the polarities of said differential signal have been identified correctly; and wherein said data reception means having a first terminal and a second terminal for receiving said differential signal, regards a signal input into said first terminal to have positive polarity and a signal input into said second terminal to have negative polarity when said polarity indication signal is in said first state, or regards a signal input into said first terminal to have negative polarity and a signal input into said second terminal to have positive polarity when said polarity indication signal is in said second state, in order to generate a digital signal.

23. Electronic equipment that receives and processes packetized data in the form of a differential signal which is formed by a positive-polarity signal and a negative-polarity signal, said electronic equipment comprising:

a data reception device as defined in claim 1, for generating a bit synchronization signal and serial binary data based on said differential signal; and processing means for performing processing on the basis of said bit synchronization signal and said serial binary data.

24. Electronic equipment that receives and processes packetized data in the form of a differential signal which is formed by a positive-polarity signal and a negative-polarity signal, said electronic equipment comprising:

a data reception device as defined in claim 2, for generating a bit synchronization signal and serial binary data based on said differential signal; and processing means for performing processing on the basis of said bit synchronization signal and said serial binary data.

25. Electronic equipment that receives and processes packetized data in the form of a differential signal which is formed by a positive-polarity signal and a negative-polarity signal, said electronic equipment comprising:

a data reception device as defined in claim 3, for generating a bit synchronization signal and serial binary data based on said differential signal; and processing means for performing processing on the basis of said bit synchronization signal and said serial binary data.

26. Electronic equipment that receives and processes packetized data in the form of a differential signal which is formed by a positive-polarity signal and a negative-polarity signal, said electronic equipment comprising:

a data reception device as defined in claim 15, for generating a bit synchronization signal and serial binary data based on said differential signal; and processing means for performing processing on the basis of said bit synchronization signal and said serial binary data.

27. A data reception method for receiving packetized data in the form of a differential signal which is formed by a positive-polarity signal and a negative-polarity signal, said method comprising:

a data reception step of generating a digital signal based on said differential signal;

a decode step of generating a bit synchronization signal and serial binary data based on said digital signal; and a polarity determination step of using said bit synchronization signal to sample said serial binary data output in said decode step, and determining on the basis of the thus sampled data whether or not the polarities of said differential signal have been identified correctly in said data reception step;

wherein it is determined that the polarities of said differential signal have been identified incorrectly in said polarity determination step, when the first consecutive pair of identical bits within a received packet of data is detected to be 00; and wherein said data reception step comprises a step of correcting polarities so that they will be identified correctly, when it has been determined that the polarities of said differential signal have been identified incorrectly in said polarity determination step.

28. A data reception method for receiving packetized data in the form of a differential signal which is formed by a positive-polarity signal and a negative-polarity signal, said method comprising:

a data reception step of generating a digital signal based on said differential signal;

a decode step of generating a bit synchronization signal and serial binary data based on said digital signal; and a polarity determination step of using said bit synchronization signal to sample said serial binary data output in said decode step, and determining on the basis of the thus sampled data whether or not the polarities of said differential signal have been identified correctly in said data reception step;

wherein it is determined that the polarities of said differential signal have been identified incorrectly in said polarity determination step, when the first consecutive pair of identical bits within each of n packets of data received in succession is detected to be 00; and wherein said data reception step comprises a step of correcting polarities so that they will be identified correctly, when it has been determined that the polarities of said differential signal have been identified incorrectly in said polarity determination step.

29. A data reception method for receiving packetized data in the form of a differential signal which is formed by a positive-polarity signal and a negative-polarity signal, said method comprising:

a data reception step of generating a digital signal based on said differential signal;

a decode step of generating a bit synchronization signal and serial binary data based on said digital signal;

a link detection step of detecting whether or not a link which is characteristic of a physical layer has been guaranteed, on the basis of said digital signal generated in said data reception step; and a polarity determination step of using said bit synchronization signal to sample said serial binary data output in said decode step, and determining whether or not the polarities of said differential signal have been correctly identified in said data reception step, on the basis of the thus sampled data and the detection result of said link detection step;

wherein it is determined that the polarities of said differential signal have been identified incorrectly in said polarity determination step when at least one of the following conditions is satisfied: the first consecutive pair of identical bits in each of n packets of data received in succession is detected to be 00, and it is detected that the link has not been guaranteed for a specific period of time on the basis of the detection result of said link detection step; and wherein said data reception step comprises a step of correcting polarities so that they will be identified correctly, when it has been determined that the polarities of said differential signal have been identified incorrectly in said polarity determination step.

30. A data reception method for receiving packetized data in the form of a differential signal which is formed by a positive-polarity signal and a negative-polarity signal, said method comprising:

- a data reception step of generating a digital signal based on said differential signal;
- a decode step of generating a bit synchronization signal and serial binary data according to edges of said digital signal;
- a link detection step of detecting whether or not a link which is characteristic of a physical layer has been guaranteed, on the basis of said digital signal generated in said data reception step; and
- a polarity determination step of determining whether or not the polarities of said differential signal have been correctly identified in said data reception step, on the basis of the detection result of said link detection step,
- wherein it is determined that the polarities of said differential signal have been identified incorrectly in said polarity determination step, when it is detected that the link has not been guaranteed for a specific period of time on the basis of the detection result of said link detection step; and
- wherein said data reception step comprises a step of correcting polarities so that they will be identified correctly, when it has been determined that the polarities of said differential signal have been identified incorrectly in said polarity determination step.

* * * * *